US012256452B2

(12) United States Patent
Wu

(10) Patent No.: US 12,256,452 B2
(45) Date of Patent: Mar. 18, 2025

(54) COMMUNICATION OF SEGMENTED RADIO RESOURCE CONTROL MESSAGES

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 455 days.

(21) Appl. No.: 17/627,236

(22) PCT Filed: Jul. 9, 2020

(86) PCT No.: PCT/US2020/041318
§ 371 (c)(1),
(2) Date: Jan. 14, 2022

(87) PCT Pub. No.: WO2021/011279
PCT Pub. Date: Jan. 21, 2021

(65) Prior Publication Data
US 2022/0264684 A1    Aug. 18, 2022

Related U.S. Application Data

(60) Provisional application No. 62/882,923, filed on Aug. 5, 2019, provisional application No. 62/879,713, filed
(Continued)

(51) Int. Cl.
*H04W 76/19*  (2018.01)
*H04L 5/00*  (2006.01)
(Continued)

(52) U.S. Cl.
CPC ........... *H04W 76/18* (2018.02); *H04L 5/0048* (2013.01); *H04L 5/0053* (2013.01); *H04W 24/08* (2013.01);
(Continued)

(58) Field of Classification Search
CPC .. H04W 24/08; H04W 28/065; H04L 5/0048; H04L 5/0053
See application file for complete search history.

(56) References Cited

U.S. PATENT DOCUMENTS 11,330,661 B2    5/2022   Kim et al.
2007/0291695 A1  12/2007  Sammour et al.
(Continued)

FOREIGN PATENT DOCUMENTS

KR   10-2020-0074725   *  6/2020   ............ H04W 28/06
KR   2020-0074725 A       6/2020
(Continued)

OTHER PUBLICATIONS

English Translation of KR 10-2020-0074725 (Year: 2020).*
(Continued)

*Primary Examiner* — Jamal Javaid
*Assistant Examiner* — Ryan C Kavleski
(74) *Attorney, Agent, or Firm* — MARSHALL, GERSTEIN & BORUN LLP

(57) ABSTRACT

A method, in a user device configured to communicate with a first base station via a radio link, for managing communication of a segmented radio resource control (RRC) message that includes N segments includes transmitting (212) a first M segments of the segmented RRC message to the first base station, M being an integer greater than zero and less than N, detecting (220), by processing hardware of the user device and before transmitting an (M+1)-th segment of the segmented RRC message, a failure of the radio link, and, after detecting the failure of the radio link, transmitting (264) at least a last N–M+1 segments of the segmented RRC message to either the first base station or a second base station.

10 Claims, 17 Drawing Sheets

Related U.S. Application Data on Jul. 29, 2019, provisional application No. 62/875,041, filed on Jul. 17, 2019.

(51) Int. Cl.

| | | |
|---|---|---|
| *H04W 24/08* | (2009.01) | |
| *H04W 28/06* | (2009.01) | |
| *H04W 36/08* | (2009.01) | |
| *H04W 76/18* | (2018.01) | |
| *H04W 76/20* | (2018.01) | |
| *H04W 76/27* | (2018.01) | |

(52) U.S. Cl.
CPC ......... *H04W 28/065* (2013.01); *H04W 36/08* (2013.01); *H04W 76/19* (2018.02); *H04W 76/20* (2018.02); *H04W 76/27* (2018.02)

(56) References Cited

U.S. PATENT DOCUMENTS

| | | | |
|---|---|---|---|
| 2008/0287105 | A1 | 11/2008 | Wu et al. |
| 2009/0103445 | A1 | 4/2009 | Sammour et al. |
| 2010/0034171 | A1 | 2/2010 | Pelletier et al. |
| 2011/0032889 | A1 | 2/2011 | Lee et al. |
| 2012/0230219 | A1 | 9/2012 | Pettersson et al. |
| 2012/0300748 | A1 | 11/2012 | Lindstrom et al. |
| 2014/0056243 | A1 | 2/2014 | Pelletier et al. |
| 2014/0293908 | A1 | 10/2014 | Kumar et al. |
| 2015/0289157 | A1 | 10/2015 | Lundqvist et al. |
| 2016/0029275 | A1 | 1/2016 | Guo et al. |
| 2016/0135097 | A1 | 5/2016 | Jinnu et al. |
| 2016/0285592 | A1 | 9/2016 | Hsu et al. |
| 2016/0285716 | A1 | 9/2016 | Pelletier et al. |
| 2017/0294977 | A1 | 10/2017 | Uchino et al. |
| 2018/0123739 | A1 | 5/2018 | Yi et al. |
| 2018/0317137 | A1 | 11/2018 | Loehr et al. |
| 2018/0324617 | A1 | 11/2018 | Schmidt et al. |
| 2019/0053113 | A1 | 2/2019 | Wu |
| 2019/0104432 | A1 | 4/2019 | Dhanapal et al. |
| 2019/0150217 | A1* | 5/2019 | Kim ............... H04L 1/1809 370/329 |
| 2019/0200212 | A1 | 6/2019 | Quan et al. |
| 2019/0289661 | A1 | 9/2019 | Chen |
| 2019/0394807 | A1 | 12/2019 | Xiao et al. |
| 2020/0107223 | A1 | 4/2020 | Liu et al. |
| 2020/0146093 | A1* | 5/2020 | Zhang ............... H04L 5/0053 |
| 2020/0196376 | A1* | 6/2020 | Kim ............... H04W 76/27 |
| 2021/0153022 | A1 | 5/2021 | Ohlsson et al. |
| 2021/0211865 | A1 | 7/2021 | Li et al. |
| 2022/0191962 | A1 | 6/2022 | Di Girolamo et al. |
| 2022/0217583 | A1 | 7/2022 | Jin et al. |

FOREIGN PATENT DOCUMENTS

| | | |
|---|---|---|
| KR | 2020-0128977 A | 11/2020 |
| WO | WO-2021/012168 A1 | 1/2021 |

OTHER PUBLICATIONS

International Search Report and Written Opinion for Application No. PCT/US2020/041334, dated Sep. 7, 2020.
International Search Report and Written Opinion for Application No. PCT/US2020/041318, dated Sep. 9, 2020.
Huawei et al., "Segmentation of UE Radio Capability Information," 3GPP Draft (2018).
International Search Report and Written Opinion for Application No. PCT/US2020/041324, dated Sep. 23, 2020.
Samsung, "SRB Type for the Segmented UECapabilityInformation," 3GPP Draft (2019).
Apple, "Segmentation of UE Capability," 3GPP Draft (2019).
Huawei et al., "Signalling of Supportings Segmentation of UE Capability," 3GPP Draft (2019).
3GPP, "3rd Generation Partnership Project: Technical Specification Group Radio Access Network; NR and Evolved Universal Terrestrial Radio Access (E-UTRA); Study on Optimizations of UE Radio Capability Signalling: Release 16," (2019).
International Preliminary Report on Patentability for Application No. PCT/US2020/041324, dated Oct. 5, 2021.
International Preliminary Report on Patentability for Application No. PCT/US2020/041334, dated Oct. 5, 2021.
First Examination Report for India Application No. 202247007030, dated May 31, 2022.
Office Action for European Application No. 20745457.0, dated Apr. 2, 2024.
3GPP TS 38.331 V15.5.1 (Apr. 2019), 3rd Generation Partnership Project; Technical Specification Group Radio Access Network; NR; Radio Resource Control (RRC) Protocol Specification (Release 15), 491 pages.
3GPP TR 37.873 V0.1.0 (Mar. 2019), 3rd Generation Partnership Project; Technical Specification Group Radio Access Network; Study on Optimizations of UE Radio Capability Signalling; NR / Evolved Universal Terrestrial Radio Access Network (E-UTRAN) aspects (Release 16), 18 pages.
3GPP TS 38.300 V16.1.0 (Mar. 2020), 3rd Generation Partnership Project; Technical Specification Group Radio Access Network; NR; NR and NG-RAN Overall Description; Stage 2 (Release 16), 133 pages.
3GPP Ts 38.331 V15.6.0 (Jun. 2019), 3rd Generation Partnership Project; Technical Specification Group Radio Access Network; NR; Radio Resource Control (RRC) Protocol (Release 15), 519 pages.
3GPP TSG-RAN2 Meeting#105, R2-1901292, Resubmission of R2-1817648, Athens Greece, Feb. 25-Mar. 1, 2019, "Segmentation of UE Radio Capability Information", 3 pages.
3GPP TSG-RAN2 Meeting#106, R2-1907570, Revision of R2-1904814, Reno Nevada, USA, May 13-17, 2019, "Signalling of Supporting Segmentation of UE Capability", 3 pages.
3GPP TSG-RAN2 WG2 Meeting#106, R2-1907721, Reno, Nevada, USA, May 13-17, 2019, "SRB Type for the Segmentated UE Capability Information", 3 pages.

* cited by examiner

COMMUNICATION OF SEGMENTED RADIO RESOURCE CONTROL MESSAGES

FIELD OF THE DISCLOSURE

This disclosure relates to radio resource control messaging and, more particularly, to wireless communication systems that communicate radio resource control messages that are divided into multiple segments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication networks, user devices (commonly referred to using the acronym "UE" for "user equipment") can divide certain radio resource control (RRC) messages into multiple segments, and sequentially transmit those segments to a base station of a radio access network (RAN). According to one proposal for the 3rd Generation Partnership Project (3GPP) specification for fifth-generation (5G) radio access ("NR") networks, for example, a user device can divide an RRC protocol data unit (PDU) containing a UECapabilityInformation message (and thus, the message itself) into multiple segments, and sequentially transmit those segments to a base station via a radio link. The UE capability transfer procedure is described in more detail in 3GPP TS 38.331 v15.5.1.

Segmentation of an RRC message can be problematic, however. In some instances, for example, the radio link may fail before the user device has transmitted all segments of a particular RRC message. Moreover, the user device may not know whether the intended recipient (base station) successfully received all of the segments that the user device had transmitted before the failure. For instance, if the user device detects a radio link failure after transmitting the first two segments of a four-segment RRC message, the user device may not know whether the base station successfully received the second segment. Thus, if the user device and base station reestablish an RRC connection, the user device might simply proceed to transmit the next (third) segment in the sequence, and the base station may never receive the second segment. As a more specific example, if the segmented message is a UECapabilityInformation message, the user device and base station may fail to successfully complete the UE capability transfer procedure, in which case the base station may fail to learn certain capabilities of the user device.

SUMMARY

Techniques of this disclosure increase the probability that a user device will successfully communicate all segments of a segmented RRC message (e.g., a UECapabilityInformation message) to one or more base stations of a RAN, even in the event of radio link failure, and without retransmitting segments unnecessarily. The techniques concern scenarios in which the user device, after transmitting to a RAN the first M segments of an RRC message that includes N segments ($0<M\leq N$), detects a failure of the radio link. Thereafter, the user device transmits at least the last $N-M+1$ segments of the segmented RRC message to the RAN. In some of these implementations, the user device transmits all N segments to the RAN after detecting the failure (e.g., after completion of an RRC connection establishment or reestablishment procedure), including all M segments that the user device had previously transmitted (before detecting the failure). Thus, the RAN can successfully receive all segments of the segmented RRC message, even if the RAN failed to receive one or more segments that the user device had transmitted around the time of the radio link failure.

In other implementations, the user device transmits only a subset of the N segments (but still at least the last $N-M+1$ segments) of the segmented RRC message to the RAN after detecting the failure. In some of these implementations, to inform the user device of which segments to transmit or re-transmit, the RAN sends the user device an RRC message indicating (explicitly or implicitly) the last (L-th) segment that was successfully received by the RAN. L may be one less than M (i.e., if only one transmitted segment was lost), for example. The user device may then, in response to the RRC message/indication, transmit to the RAN only those segments that the RAN had not successfully received (i.e., the last N-L segments). Again, therefore, the RAN can successfully receive all segments of the segmented RRC message, even if the RAN failed to receive one or more segments that the user device had transmitted around the time of the radio link failure. Moreover, these latter implementations can increase network efficiency by only requiring that the user device transmit (or re-transmit) those segments that the RAN had not successfully received.

One example implementation of these techniques is a method, in a user device configured to communicate with a first base station via a radio link, for managing communication of a segmented RRC message that includes N segments. The method includes transmitting a first M segments of the segmented RRC message to the first base station (M being an integer greater than zero and less than N), detecting, by processing hardware of the user device and before transmitting an (M+1)-th segment of the segmented RRC message, a failure of the radio link, and, after detecting the failure of the radio link, transmitting at least a last $N-M+1$ segments of the segmented RRC message to either the first base station or a second base station.

Another example implementation of these techniques is a method, in a base station configured to communicate with a user device via a radio link, for managing communication of a segmented RRC message that includes N segments. The method includes receiving a first L segments of the segmented RRC message from either the user device or another base station (L being an integer greater than zero and less than N), and, after a failure of the radio link, generating, by processing hardware of the base station, an RRC message indicating that the base station received the first L segments. The method also includes transmitting the RRC message to the user device to cause the user device to transmit at least a last N-L segments of the segmented RRC message to the base station.

DETAILED DESCRIPTION OF THE DRAWINGS

Generally speaking, the techniques of this disclosure allow a user device (UE) to successfully communicate all segments of a segmented RRC message to one or more base stations of a RAN, even in the event of radio link failure, and without retransmitting segments unnecessarily. In this disclosure, any reference to different actions (e.g., receiving, transmitting, etc.) being performed by a "RAN" may indicate that the actions are all performed by a single base station of the RAN, or that the actions are performed by different base stations of the RAN, depending on the implementation and/or scenario. For example, a series of communications between a user device and a RAN may involve two different base stations if a handover occurs during the course of those communications. Also in this disclosure, and depending on the implementation and/or scenario, "failure" of a radio link may specifically refer to Radio Link Failure or "RLF" (e.g., as defined in the 5G standard), or may more generally refer to the user device and RAN being unable to communicate via the radio link for any reason.

These techniques are discussed below with example reference to a 5G radio access ("NR") network and a 5G core network (5GC). However, the techniques of this disclosure can apply to other radio access and/or core network technologies.

Figure 1:
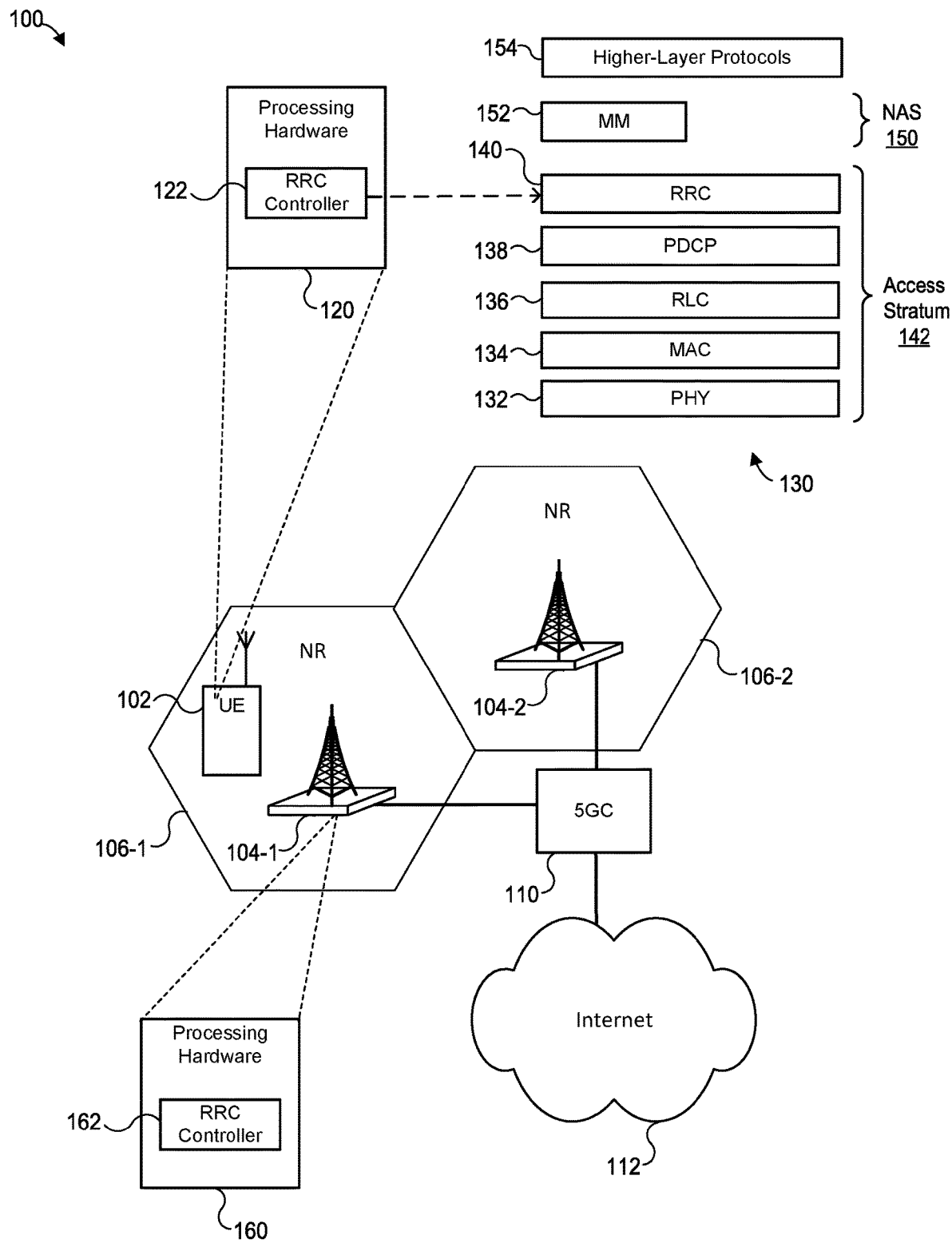
FIG. 1 is a block diagram of an example wireless communication network in which a user device and base stations of this disclosure can communicate segmented RRC messages.

Referring first to FIG. 1, a UE 102 can operate in an example wireless communication network 100. The wireless communication network 100 includes base stations 104-1 and 104-2, associated with respective cells 106-1 and 106-2. As used herein, "RAN 104" refers to a radio access network that includes at least base stations 104-1 and 104-2. While FIG. 1 depicts each of base stations 104-1 and 104-2 as serving only one cell, it is understood that the base station 104-1 and/or the base station 104-2 may also cover one or more additional cells not shown in FIG. 1. In general, the wireless communication network 100 can include any number of base stations, and each of the base stations can cover one, two, three, or any other suitable number of cells.

The base stations 104-1 and 104-2 may each operate as a 5G Node B (gNB), for example, and are referred to as such the example messaging diagrams of FIGS. 2-9 (discussed below). As seen in FIG. 1, the base station 104-1 and the base station 104-2 are both connected to a 5GC 110, which is in turn connected to the Internet 112. In various alternative implementations and/or scenarios, the wireless communication network 100 does not include the base station 104-2 and/or the cell 106-2, or the base station 104-2 is a next-generation evolved Node B (ng-eNB) and the cell 106-2 is an Evolved Universal Terrestrial Radio Access (EUTRA) cell, etc.

The UE 102 can support an NR air interface, and exchange messages with the base station 104-1 when operating in the cell 106-1 or the base station 104-2 when operating in the cell 106-2. In other implementations, the UE 102 also can support a EUTRA air interface, and exchange messages with the base station 104-1 over 5G NR when operating in the cell 106-1, and with the base station 104-2 over EUTRA when operating in the cell 106-2. As discussed below, the UE 102 can be any suitable device capable of wireless communications.

The UE 102 is equipped with processing hardware 120, which can include one or more general-purpose processors (e.g., CPUs) and a non-transitory computer-readable memory storing instructions that the one or more general-purpose processors can execute. Additionally or alternatively, the processing hardware 120 can include special-purpose processing units, such as a wireless communication chipset, for example. The processing hardware 120 includes an RRC controller 122. The RRC controller 122 is responsible for inbound messaging, outbound messaging, and internal procedures at the corresponding layer of a wireless communication protocol stack 130, discussed further below. While not shown in FIG. 1, the processing hardware 120 may also include a controller for each of a number of other layers, such as a mobility management (MM) controller and/or a packet data convergence protocol (PDCP) controller. For example, a PDCP controller of UE 102 may generate PDUs that package/contain RRC PDUs (containing RRC messages) generated by RRC controller 122.

The RRC controller 122 can be implemented using any suitable combination of hardware, software, and/or firmware. In one example implementation, the RRC controller 122 is a set of instructions that defines respective components of the operating system of the UE 102, and one or more CPUs of the processing hardware 120 execute these instructions to perform the respective RRC functions. In another implementation, the RRC controller 122 is implemented using firmware as a part of a wireless communication chipset.

The protocol stack 130, illustrated in a simplified manner in FIG. 1, includes, among other possible layers, a physical layer 132 (commonly abbreviated as the PHY layer), a medium access control layer 134 (commonly abbreviated as the MAC layer), a radio link control (RLC) layer 136, a PDCP layer 138, and an RRC layer 140, as parts of an access stratum 142. A non-access stratum (NAS) 150 of the protocol stack 130 includes, among other possible layers, one or more MM layers 152 for handling registration, attachment, or tracking area update procedures. As further illustrated in FIG. 1, the protocol stack 130 also supports higher-layer protocols 154 for various services and applications. For example, the higher-layer protocols 154 may include Internet Protocol (IP), Transmission Control Protocol and User Datagram Protocol (UDP).

The RRC layer 140 packages and interprets RRC PDUs, which may contain any of various types of RRC messages associated with different RRC procedures (e.g., connection establishment or reestablishment procedures, a UE capability transfer procedure, a measurement reporting procedure, etc.). The various layers 132, 134, 136, 138, 140, 141, 152 and 154 may be ordered as shown in FIG. 1. It is understood, however, that in some implementations and/or situations, one or more of the depicted layers may operate in a manner that does not strictly conform to the ordering shown in FIG. 1.

On the UE 102 side, the RRC layer 140 (i.e., RRC controller 122) can divide one or more types of RRC messages into multiple segments, and transmit the segments sequentially. In some implementations, the RRC controller 122 accomplishes this by including a particular RRC message in an RRC PDU, and then segmenting the RRC PDU such that each RRC PDU segment includes a corresponding RRC message segment. In this disclosure, reference to the transmission or reception of an RRC message segment may indicate (in some implementations) that the RRC message segment is transmitted or received, respectively, within a segment of an RRC PDU. As one example, if the UE 102 receives a UECapabilityEnquiry message from the base station 104-1, the RRC controller 122 may respond by generating a UECapabilityInformation message, packaging the UECapabilityInformation message in an RRC PDU, dividing the RRC PDU into multiple segments, and then causing the UE 102 to sequentially transmit the RRC PDU segments to the base station 104-1.

The base station 104-1 is equipped with processing hardware 160, which can include one or more general-purpose processors (e.g., CPUs) and a non-transitory computer-readable memory storing instructions that the one or more general-purpose processors can execute. Additionally or alternatively, the processing hardware 160 can include special-purpose processing units, such as a wireless communication chipset, for example. Similar to the processing hardware 120 of UE 102, the processing hardware 160 includes an RRC controller 162. While the RRC controller 122 of the UE 102 implements functionality of the RRC layer 140 on the user device 102 side, however, the RRC controller 162 of the base station 104-1 implements functionality of the RRC layer 140 on the base station 104-1 side. As just one example, the RRC controller 122 may generate a measurement report message and cause the UE 102 to transmit the measurement report message to the base station 104-1, while the RRC controller 162 may interpret the measurement report message when received at the base station 104-1. While not shown in FIG. 1, the processing hardware 160 may also include a controller for each of a number of other layers, such as an MM and/or PDCP controller.

The RRC controller 162 can be implemented using any suitable combination of hardware, software, and/or firmware. In one example implementation, the RRC controller 162 is a set of instructions that defines respective components of the operating system of the base station 104-1, and one or more CPUs of the processing hardware 160 execute these instructions to perform the respective RRC functions. In another implementation, the RRC controller 162 is implemented using firmware as a part of a wireless communication chipset. In some implementations, the base station 104-2 includes processing hardware similar to the processing hardware 160 of the base station 104-1. In other implementations, the base station 104-2 may be co-located with the base station 104-1 and share some of the processing hardware 160 of the base station 104-1.

On the base station 104-1 side, the RRC layer 140 (i.e., RRC controller 162) can process one or more types of RRC messages received as multiple, sequential segments. As one example, if the base station 104-1 receives a sequence of segments of a UECapabilityInformation message from the UE 102 (e.g., within a sequence of RRC PDU segments), the RRC controller 162 can successfully interpret the segmented message (i.e., determine the capabilities of the UE 102 as indicated in the entire UECapabilityInformation message).

For simplicity, FIG. 1 does not depict various components of the UE 102 and the base stations 104-1, 104-2. In addition to the layer-specific controllers mentioned above, for example, the UE 102 and the base stations 104-1, 104-2 include respective transceivers, which comprise various hardware, firmware, and software components that are configured to transmit and receive wireless signals according to the NR air interface. The processing hardware 120 and the processing hardware 160 (and similar processing hardware in the base station 104-2) can send commands and exchange information with the respective transceivers as needed to perform various connection establishment procedures, perform various RRC or MM procedures, or communicate with other network elements, etc.

Example message sequences and methods that the UE 102, base station 104-1, and/or base station 104-2 can implement and execute, alone or in combination with other components of the network 100 (e.g., 5GC 110), will now be discussed with reference to FIGS. 2-9. The UE 102 and/or base stations 104-1, 104-2 can implement at least some of the acts described below in software, firmware, hardware, or any suitable combination of software, firmware, and hardware. Although FIGS. 2-9 are discussed below with reference to the components depicted in FIG. 1 and a 5G system, in general any suitable components or wireless communication network may be used.

Figure 2:
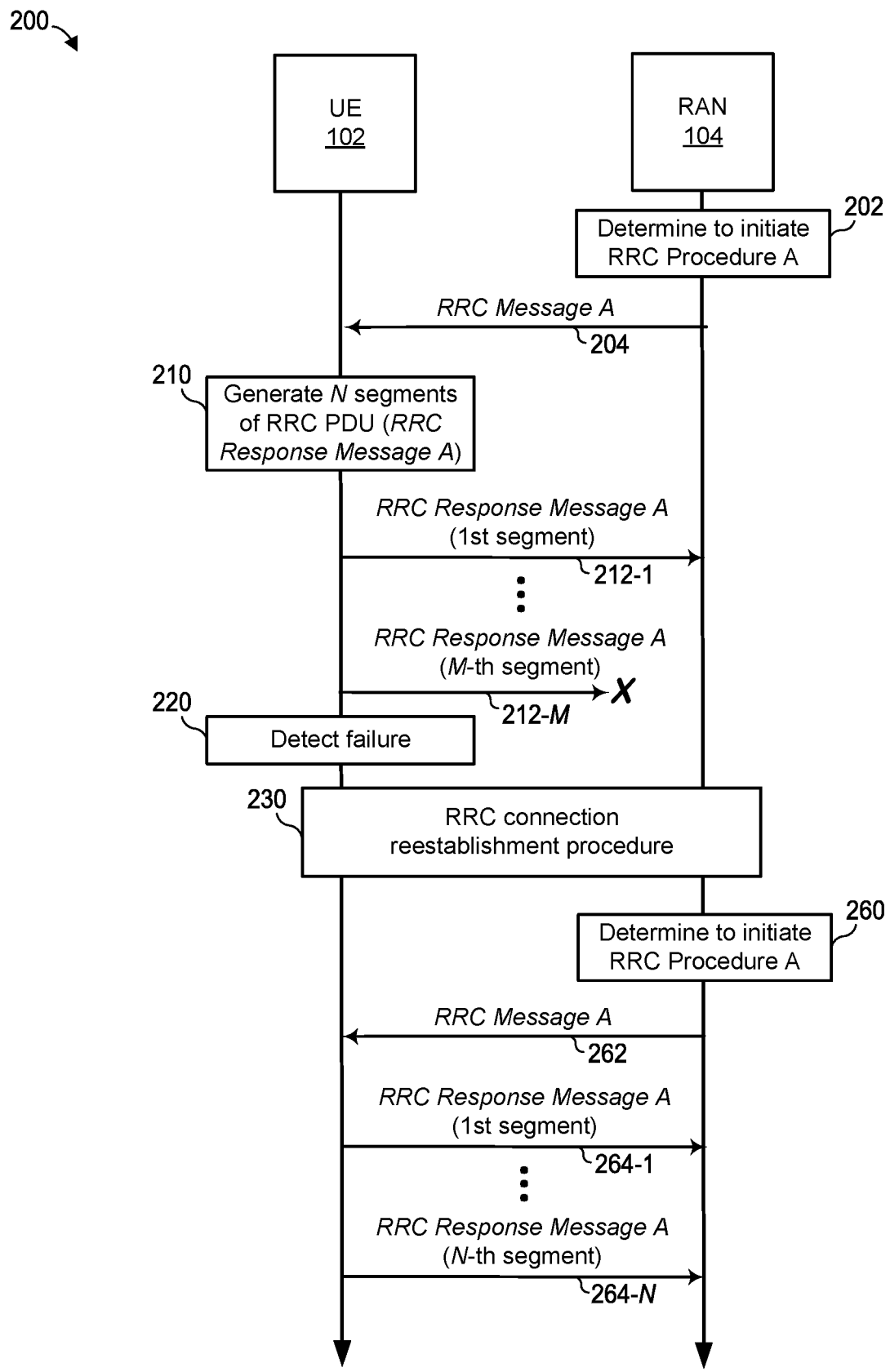
FIGS. 2-9 depict various messaging diagrams related to the transmission of a segmented RRC message in the wireless communication network of FIG. 1.

Referring first to FIG. 2, a messaging diagram 200 depicts example messages that may be exchanged between the UE 102 and the RAN 104 of FIG. 1, and associated operations, according to one implementation and scenario. In the messaging diagram 200, all operations shown for the UE 102 may be performed by (or triggered by, e.g., in the case of message transmission) the RRC controller 122 of the UE 102. Similarly, the operations shown for the RAN 104 may be performed by (or triggered by) the RRC controller 162 of the base station 104-1, or a similar RRC controller of the base station 104-2.

At the start of the messaging diagram 200, the UE 102 and the RAN 104 have already established an RRC connection. As seen in FIG. 2, the RAN 104 determines 202 to initiate a particular RRC procedure ("RRC Procedure A"), and then transmits 204 an RRC message ("RRC Message A") to the UE 102. RRC Procedure A may be a UE capability transfer procedure as defined in 3GPP TS 38.331 v15.5.1, and RRC Message A may be a UECapabilityEnquiry message, for example.

In response to receiving and processing RRC Message A, the UE 102 generates 210 all N segments of an RRC PDU containing an RRC response message ("RRC Response Message A"), where N is an integer greater than one (e.g., two, four, 10, 16, etc.). If RRC Procedure A is a UE capability transfer procedure, for example, then RRC Response Message A may be a UECapabilityInformation message that specifies various capabilities of the UE 102 (e.g., radio access technologies supported by the UE 102, etc.). As one example, generating 210 the N segments may include generating the RRC Response Message A, including the RRC Response Message A in an RRC PDU, and then dividing the RRC PDU into the N segments.

The UE 102 then sequentially transmits (212-1 through 212-M) the first M of the N segments to the RAN 104, where M is an integer greater than zero and less than N. In other implementations, the UE 102 does not generate 210 all N segments before transmitting 212-1 the first segment. For example, the UE 102 may instead generate 210 each segment just prior to transmitting 212 that segment, such that the generating 210 and transmitting 212 operations are interleaved.

As indicated in FIG. 2 (using the symbol "X"), the radio link between the UE 102 and the RAN 104 fails before the RAN 104 receives the M-th segment. In this disclosure, reference to a device, component, etc., failing to receive a message or segment may mean that the device, component, etc. fails to receive any part of the message or segment, or receives only a portion of the message or segment.

For example, the radio link may suffer a large and sudden degradation in signal quality. At some point shortly after the failure of the radio link, the UE 102 detects 220 the failure (e.g., during or shortly after transmission of the M-th segment). For example, the UE 102 may periodically measure one or more radio link quality metrics (e.g., signal to noise ratio (SNR), signal to interference-plus-noise ratio (SINR), block, bit or packet error rate, and/or other suitable metrics), and determine from those measurements that the radio link quality has degraded past some threshold value. However, the UE 102 may be unaware of whether the RAN 104 successfully received the M-th segment, and possibly unaware of whether the RAN 104 successfully received one or more additional segments prior to the M-th segment. For example, the difference between the time of the radio link failure and the time that the UE 102 detects the failure may be great enough that the UE 102 transmits several additional segments, which the RAN 104 cannot receive due to the failure.

Thus, the UE 102 knows how many segments the UE 102 has transmitted to the RAN 104, but does not know how many segments the RAN 104 successfully received. One option, reflected in FIG. 2 (as well as FIGS. 3-7), is for the UE 102 to restart transmission of the entire RRC PDU (i.e., all N segments). Another option is for the RAN 104 to provide feedback to the UE 102, to inform the UE 102 of which segments the RAN 104 has successfully received. This latter option, which allows the UE 102 to avoid transmitting segments that the RAN 104 has already received, is reflected in FIGS. 8 and 9 (discussed below).

In response to the failure, the UE 102 and the RAN 104 perform 230 an RRC connection reestablishment procedure. After the UE 102 and RAN 104 reestablish the RRC connection, the RAN 104 determines 260 to initiate the same RRC Procedure A, and therefore transmits 262 another RRC Message A (e.g., another UECapabilityEnquiry message) to the UE 102.

In response to receiving and processing RRC Message A, the UE 102 sequentially transmits (264-1 through 264-N) all N segments of the RRC Response Message A to the RAN 104. That is, the UE 102 re-transmits (264-1 through 264-M) the first M segments sequentially, and then transmits (264-(M+1) through 264-N) the remaining segments M+1 through N sequentially, thereby increasing the probability that the RAN 104 successfully receives all of the segments. After the RAN 104 receives all segments, the RAN 104 can assemble all of the segments into the complete RRC PDU.

If, in an alternative scenario, the RAN 104 does not determine 260 to initiate RRC Procedure A and transmit 262 another RRC Message A, or if the UE 102 does not successfully receive that RRC Message A, the UE 102 may not transmit any segments, and RRC Procedure A may fail or be further delayed.

In some implementations and/or scenarios, all operations of the RAN 104 shown in FIG. 2 are performed by the base station 104-1. In other implementations and/or scenarios, however, the UE 102 connects to a new base station in response to the radio link failure. In such an implementation/scenario, all operations of the RAN 104 shown in FIG. 2 that occur prior to the RRC connection reestablishment procedure are performed by the base station 104-1, while those that occur after the RRC connection reestablishment procedure (and at least some operations of the RRC connection reestablishment procedure itself) are performed by the base station 104-2.

Figure 3A:
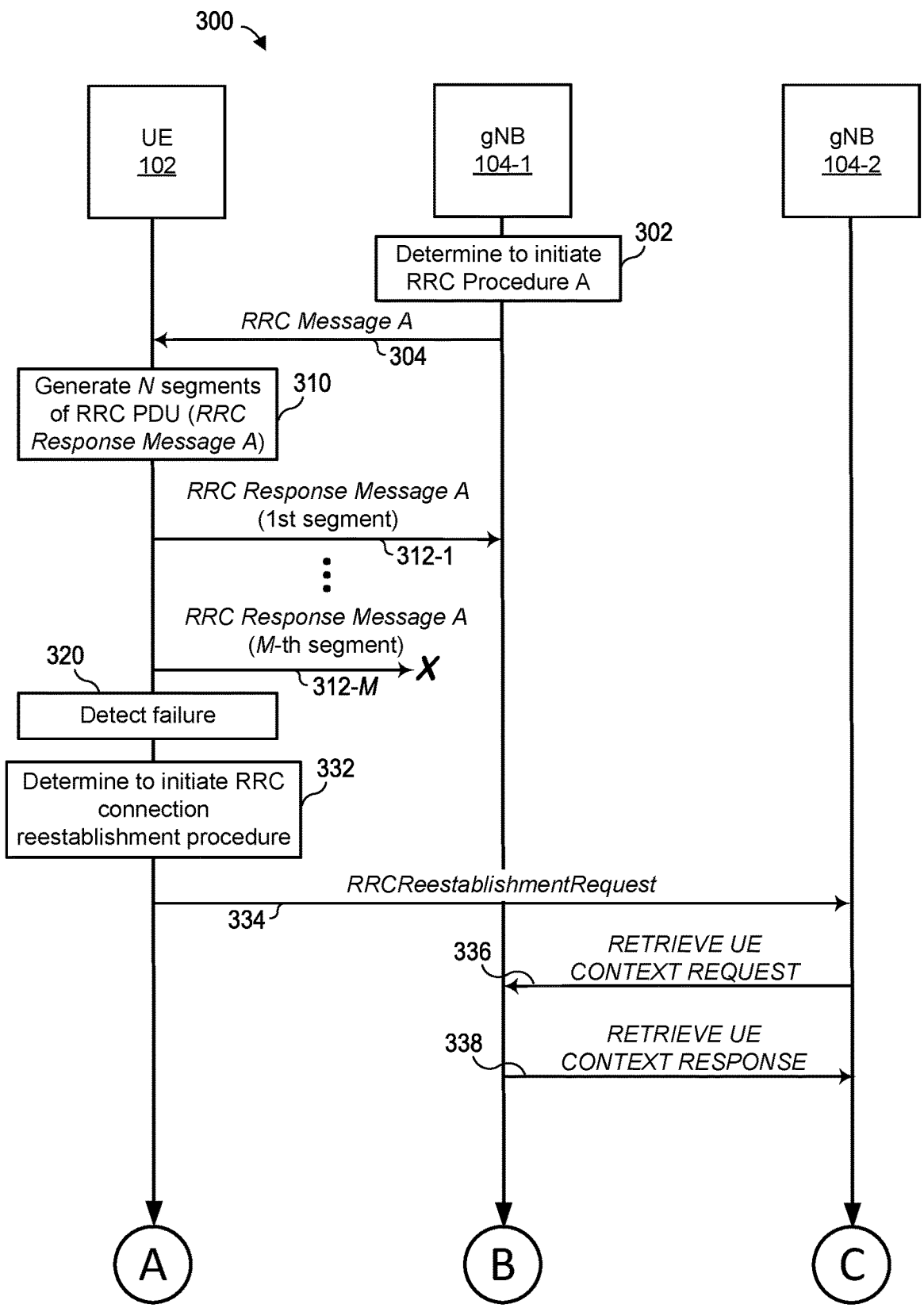
Figure 3B:
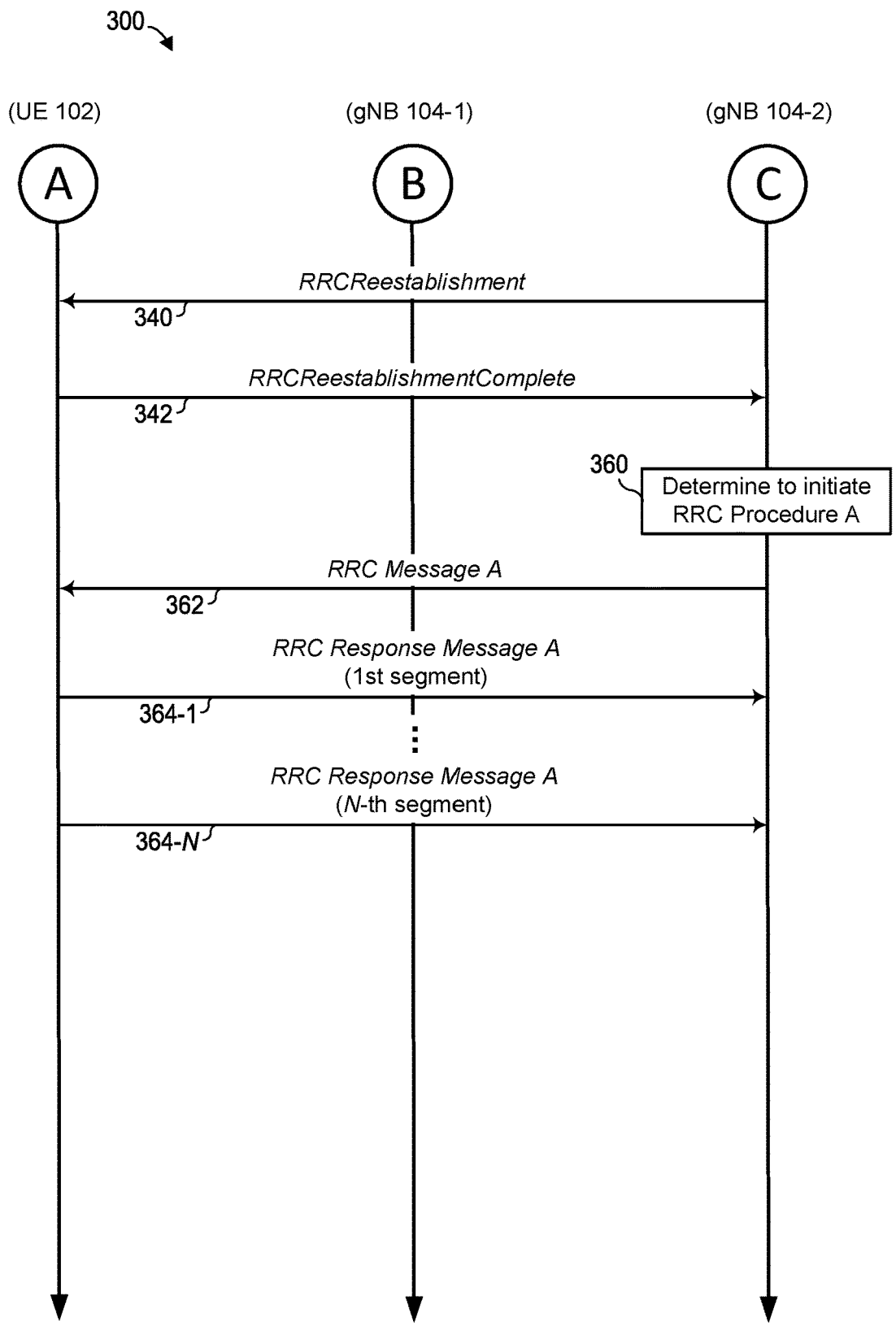

One of these latter implementations/scenarios is shown in the messaging diagram 300 of FIGS. 3A and 3B. In the messaging diagram 300, all operations shown for the UE 102 may be performed by (or triggered by, e.g., in the case of message transmission) the RRC controller 122 of the UE 102. Similarly, with the possible exception of the communications between the base stations 104-1 and 104-2, the operations shown for the base station 104-1 may be performed by (or triggered by) the RRC controller 162, and the operations shown for the base station 104-2 may be performed by (or triggered by) an RRC controller of the base station 104-2 that is similar to the RRC controller 162.

At the start of the messaging diagram 300, the UE 102 and the base station 104-1 have already established an RRC connection. As seen in FIG. 3A, the base station 104-1 determines 302 to initiate RRC Procedure A (e.g., a UE capability transfer procedure), and then transmits 304 RRC Message A (e.g., a UECapabilityEnquiry message) to the UE 102. In response, the UE 102 generates 310 all N segments of the RRC PDU containing N respective segments of RRC Response Message A, and sequentially transmits (312-1 through 312-M) the first M segments of the N segments to the base station 104-1. The generating 310 and transmitting 312 operations may occur during two distinct time periods or in an interleaved manner (e.g., as discussed above for the generating 210 and transmitting 212 operations of FIG. 2). In the depicted scenario, a radio link failure causes the base station 104-1 to fail to successfully receive at least the M-th segment. That is, the base station 104-1 receives only the first L segments, where L is an integer greater than zero and less than M. The UE 102 detects 320 the failure (e.g., as discussed above with reference to FIG. 2) and, in response, determines 332 to initiate an RRC connection reestablishment procedure with a new base station (i.e., the base station 104-2). The UE 102 then transmits 334 an RRCReestablishmentRequest message to the base station 104-2.

If the base station 104-2 does not have context information for the UE 102 (e.g., the "UE Context" as defined by the 5G specification) when receiving the RRCReestablishmentRequest message from the UE 102, the base station 104-2 transmits 336 a RETRIEVE UE CONTEXT REQUEST message to the base station 104-1, and the base station 104-1 responds by transmitting 338 to the base station 104-2 the context information for the UE 102 in a RETRIEVE UE CONTEXT RESPONSE message. In some implementations, the base station 104-1 does not include the successfully received segments of the RRC PDU (i.e., the first L segments) in the RETRIEVE UE CONTEXT RESPONSE message, or in any other message that the base station 104-1 transmits to the base station 104-2.

Figure 5A:
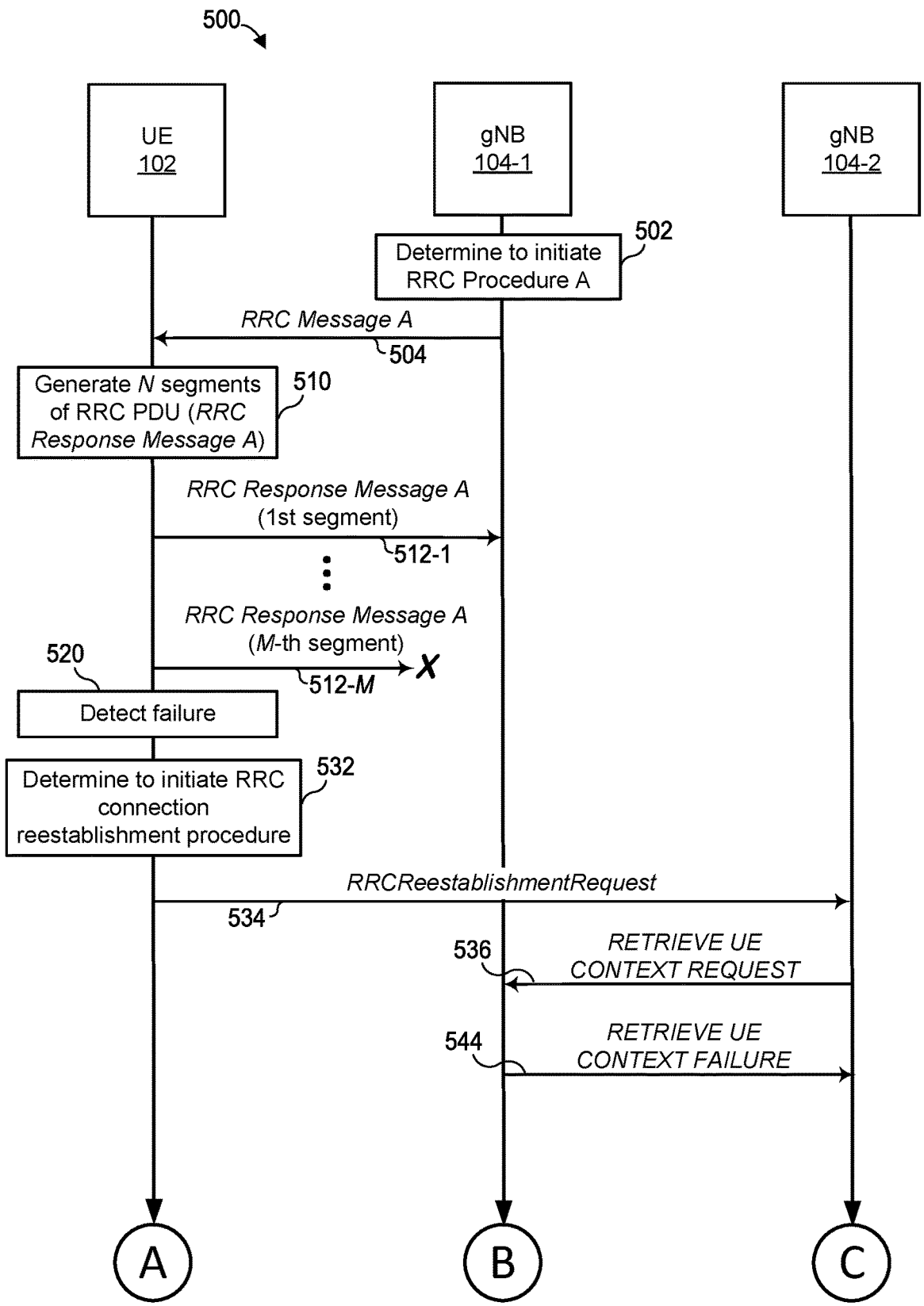
Figure 5B:
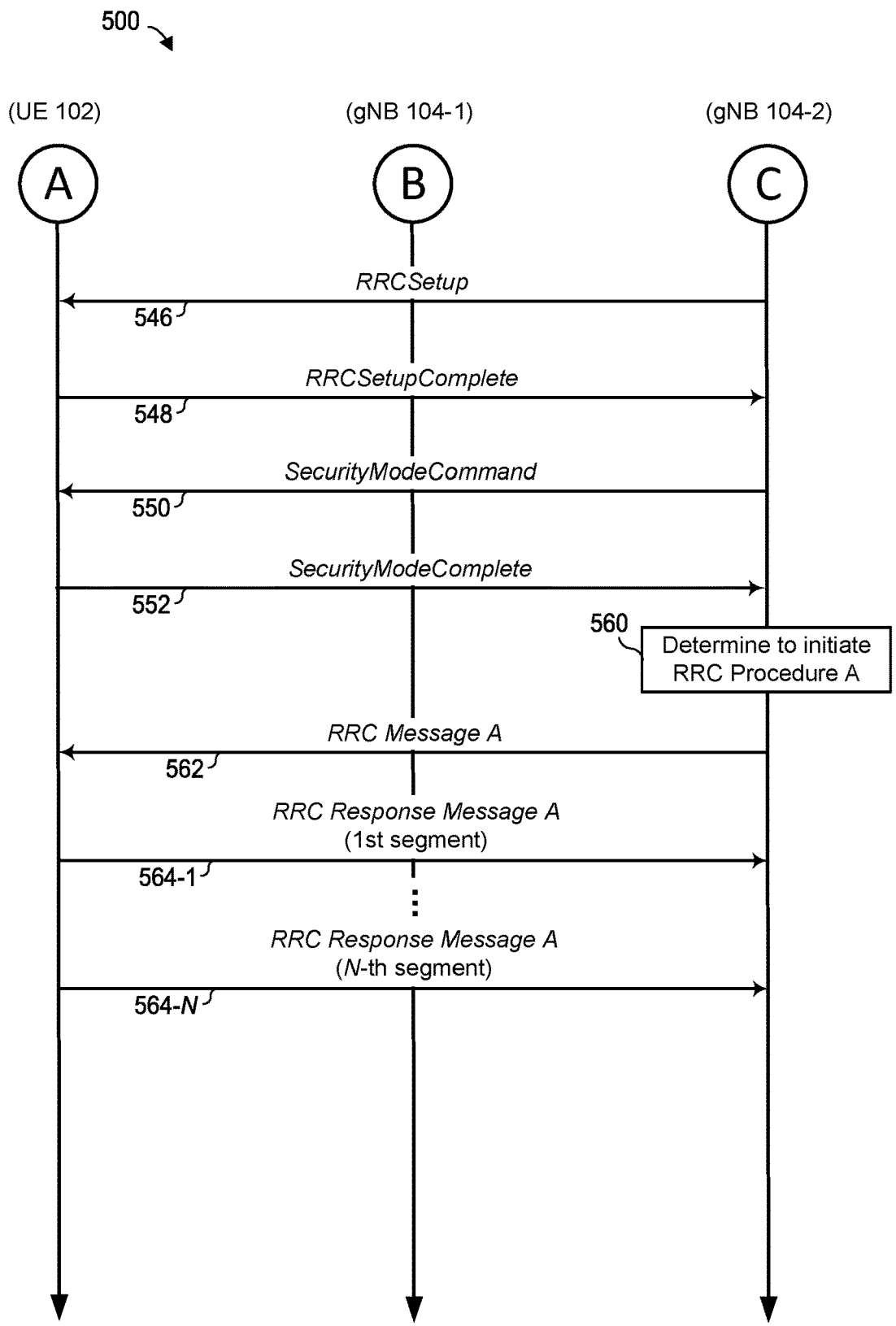

In other scenarios, where the base station 104-2 already has the context information for the UE 102 when receiving the RRCReestablishmentRequest from the UE 102, the base station 104-2 does not transmit 336 the RETRIEVE UE CONTEXT REQUEST message to the base station 104-1, and the base station 104-1 does not transmit 338 the RETRIEVE UE CONTEXT RESPONSE. FIGS. 5A and 5B, discussed below, reflect a scenario in which the base station 104-2 cannot retrieve the context information for the UE 102.

Referring now to FIG. 3B, the base station 104-2 transmits 340 an RRCReestablishment message to the UE 102, and the UE 102 responds by transmitting 342 an RRCReestablishmentComplete message to the base station 104-2. Thereafter, the base station 104-2 determines 360 to initiate the RRC Procedure A (e.g., the UE capability transfer procedure), and transmits 362 another RRC Message A (e.g., another UECapabilityEnquiry message) to the UE 102. In response to RRC Message A, the UE 102 sequentially transmits (364-1 through 364-N) all N segments of RRC Response Message A (e.g., the UECapabilityInformation message) to the base station 104-2. Thus, despite the radio link failure, and despite the base station 104-1 not forwarding the successfully received segments (e.g., the first L segments) to the base station 104-2, the base station 104-2 can receive all segments and assemble the complete RRC PDU containing RRC Response Message A.

Figure 4A:
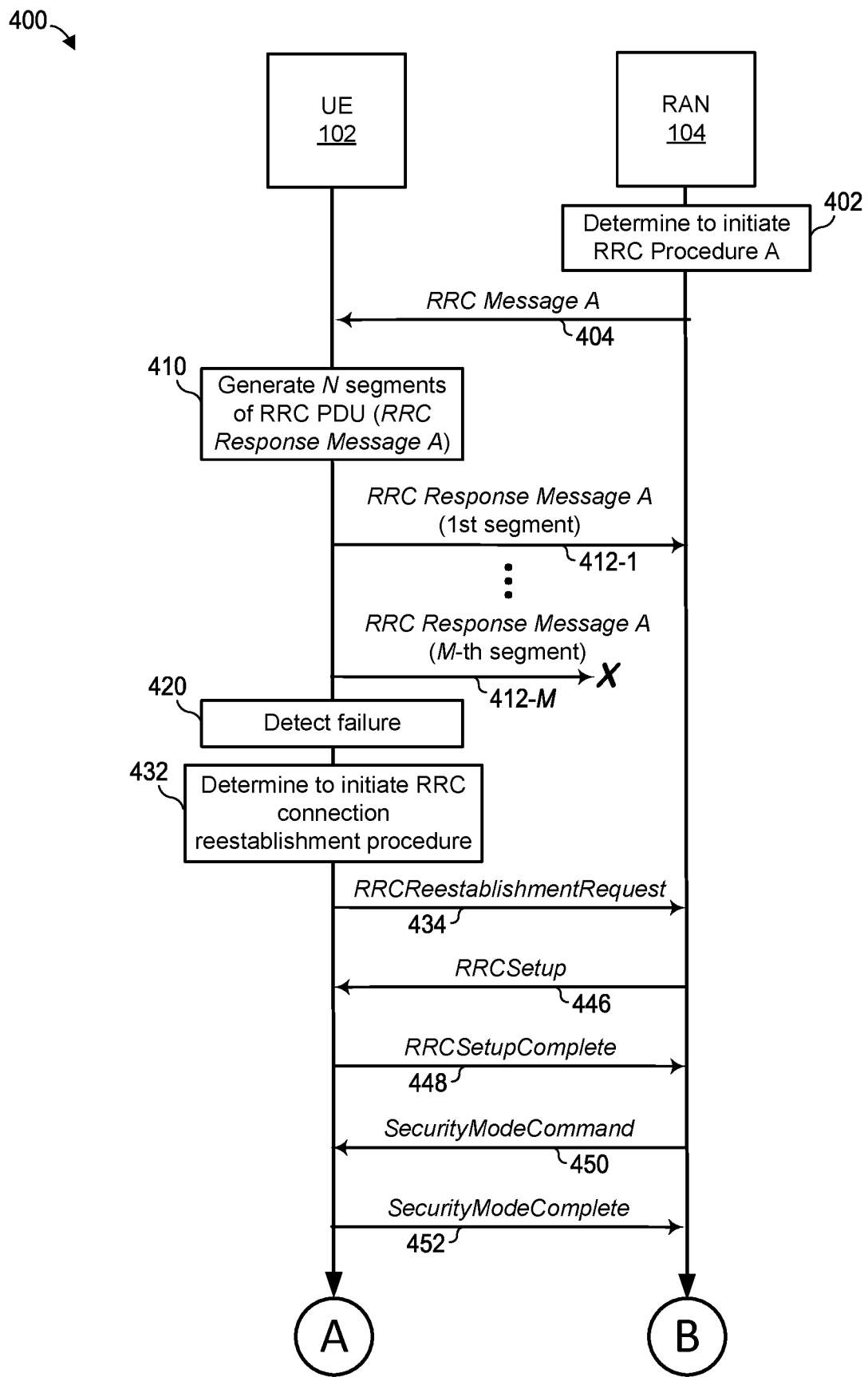
Figure 4B:
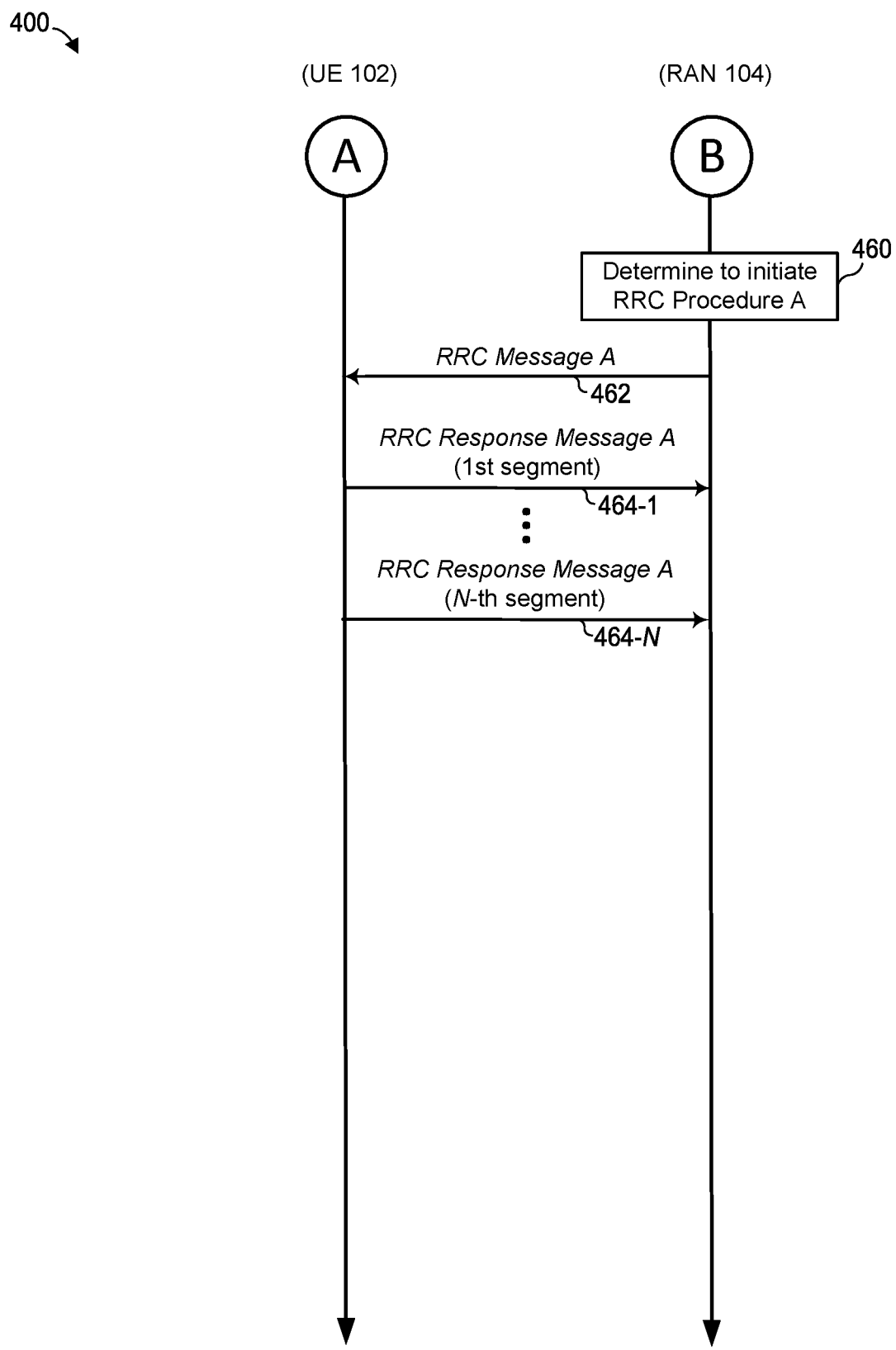

FIGS. 4A and 4B depict an example messaging diagram 400 that corresponds to a different implementation and/or scenario. In particular, and as discussed further below, the messaging diagram 400 may reflect a scenario in which the RAN 104 cannot respond to an RRCReestablishmentRequest message from the UE 102 with an RRCReestablishment message. The messaging diagram 400 may reflect the same implementation of the wireless communication network 100 as the messaging diagrams 200 and/or 300, for example, but in a different scenario (e.g., where the RAN 104 cannot retrieve context information for the UE 102 and thus cannot reestablish the connection with the UE 102). In the messaging diagram 400, all operations shown for the UE 102 may be performed by (or triggered by, e.g., in the case of message transmission) the RRC controller 122 of the UE 102. Similarly, the operations shown for the RAN 104 may be performed by (or triggered by) the RRC controller 162 of the base station 104-1, or a similar RRC controller of the base station 104-2.

At the start of the messaging diagram 400, the UE 102 and the RAN 104 have already established an RRC connection. As seen in FIG. 4A, the RAN 104 determines 402 to initiate RRC Procedure A (e.g., a UE capability transfer procedure), and then transmits 404 RRC Message A (e.g., a UECapabilityEnquiry message) to the UE 102. In response, the UE 102 generates 410 all N segments of the RRC PDU containing N respective segments of RRC Response Message A, and sequentially transmits (412-1 through 412-M) the first M segments of the N segments to the RAN 104. The generating 410 and transmitting 412 operations may occur during two distinct time periods or in an interleaved manner (e.g., as discussed above for the generating 210 and transmitting 212 operations of FIG. 2). In the depicted scenario, a radio link failure causes the RAN 104 to fail to successfully receive the M-th segment (i.e., L=M−1). The UE 102 detects 420 the failure (e.g., as discussed above with reference to FIG. 2) and, in response, determines 432 to initiate an RRC connection reestablishment procedure with the RAN 104. The UE 102 then transmits 434 an RRCReestablishmentRequest message to the RAN 104.

As noted above, in the scenario of FIGS. 4A and 4B, the RAN 104 cannot respond to the RRCReestablishmentRequest message from the UE 102 with a RRCReestablishment message. For example, the RAN 104 may fail to retrieve context information for the UE 102, or may be unable to transmit the RRCReestablishment message for some other reason. Therefore, the RAN 104 instead transmits 446 an RRCSetup message to the UE 102, and the UE 102 responds by transmitting 448 an RRCSetupComplete message to the RAN 104. Thereafter, the RAN 104 transmits 450 a SecurityModeCommand message to the UE 102 (e.g., to activate integrity protection, encryption, and/or other security schemes for communications between the RAN 104 and the UE 102), and the UE 102 responds by transmitting 452 a SecurityModeComplete message to the RAN 104.

Referring now to FIG. 4B, the RAN 104 then determines 460 to initiate the RRC Procedure A (e.g., the UE capability transfer procedure), and transmits 462 another RRC Message A (e.g., another UECapabilityEnquiry message) to the UE 102. In response to RRC Message A, the UE 102 sequentially transmits (464-1 through 464-N) all N segments of RRC Response Message A (e.g., the UECapabilityInformation message) to the RAN 104. Thus, despite the radio link failure, the RAN 104 can receive all segments and assemble the complete RRC PDU containing RRC Response Message A.

In some implementations and/or scenarios, all operations of the RAN 104 shown in FIGS. 4A and 4B are performed by the base station 104-1. In other implementations and/or scenarios, however, the UE 102 connects to a new base station in response to the radio link failure. In such an implementation/scenario, all operations of the RAN 104 shown in FIGS. 4A and 4B that occur prior to the radio link failure are performed by the base station 104-1, while those that occur after the radio link failure are performed by the base station 104-2. As will be seen in the discussion of FIGS. 5A and 5B, however, other post-failure operations of the RAN 104 (not shown in FIGS. 4A and 4B) may be performed by the base station 104-1.

One implementation/scenario in which the UE 102 connects to a new base station in response to the radio link failure is shown in the messaging diagram 500 of FIGS. 5A and 5B. In the messaging diagram 500, all operations shown for the UE 102 may be performed by (or triggered by, e.g., in the case of message transmission) the RRC controller 122 of the UE 102. Similarly, with the possible exception of the communications between the base stations 104-1 and 104-2, the operations shown for the base station 104-1 may be performed by (or triggered by) the RRC controller 162, and the operations shown for the base station 104-2 may be performed by (or triggered by) an RRC controller of the base station 104-2 that is similar to the RRC controller 162.

At the start of the messaging diagram 500, the UE 102 and the base station 104-1 have already established an RRC connection. As seen in FIG. 5A, the base station 104-1 determines 502 to initiate RRC Procedure A (e.g., a UE capability transfer procedure), and then transmits 504 RRC Message A (e.g., a UECapabilityEnquiry message) to the UE 102. In response, the UE 102 generates 510 all N segments of the RRC PDU containing N respective segments of RRC Response Message A, and sequentially transmits (512-1 through 512-M) the first M segments of the N segments to the base station 104-1. The generating 510 and transmitting 512 operations may occur during two distinct time periods or in an interleaved manner (e.g., as discussed above for the generating 210 and transmitting 212 operations of FIG. 2). In the depicted scenario, a radio link failure causes the base station 104-1 to fail to successfully receive the M-th segment (i.e., L=M−1). The UE 102 detects 520 the failure (e.g., as discussed above with reference to FIG. 2) and, in response, determines 532 to initiate an RRC connection reestablishment procedure with a new base station (i.e., the base station 104-2). The UE 102 then transmits 534 an RRCReestablishmentRequest message to the base station 104-2.

If the base station 104-2 does not have context information for the UE 102 (e.g., the "UE Context" as defined by the 5G specification) when receiving the RRCReestablishmentRequest message from the UE 102, the base station 104-2 transmits 536 a RETRIEVE UE CONTEXT REQUEST message to the base station 104-1. In the example scenario of FIGS. 5A and 5B, however, the base station 104-1 cannot retrieve context information for the UE 102, and therefore transmits 544 a RETRIEVE UE CONTEXT FAILURE message to the base station 104-2. In some implementations, the base station 104-1 does not include the successfully received segments of the RRC PDU (i.e., the first L segments) in the RETRIEVE UE CONTEXT FAILURE message, or in any other message that the base station 104-1 transmits to the base station 104-2.

Referring now to FIG. 5B, in response to the RETRIEVE UE CONTEXT FAILURE message, the base station 104-2 transmits 546 an RRCSetup message to the UE 102, and the UE 102 responds by transmitting 548 an RRCSetupComplete message to the base station 104-2. Thereafter, the base station 104-2 transmits 550 a SecurityModeCommand message to the UE 102 (e.g., to activate integrity protection, encryption, and/or other security schemes for communications between the base station 104-2 and the UE 102), and the UE 102 responds by transmitting 552 a SecurityModeComplete message to the base station 104-2. In an alternative implementation, if the base station 104-2 does not have the context information for the UE 102 at the time the base station 104-2 receives the RRCReestablishmentRequest message from the UE 102, the base station 104-2 instead transmits 546 the RRCSetup message to the UE 102 earlier (e.g., before and/or instead of transmitting 536 the RETRIEVE UE CONTEXT REQUEST message to the base station 104-1).

Next, the base station 104-2 determines 560 to initiate the RRC Procedure A (e.g., the UE capability transfer procedure), and transmits 562 another RRC Message A (e.g., another UECapabilityEnquiry message) to the UE 102. In response to RRC Message A, the UE 102 sequentially transmits (564-1 through 564-N) all N segments of RRC Response Message A (e.g., the UECapabilityInformation message) to the base station 104-2. Thus, despite the radio link failure, and despite not receiving any segments from the base station 104-1, the base station 104-2 can receive all segments and assemble the complete RRC PDU containing RRC Response Message A.

Figure 6A:
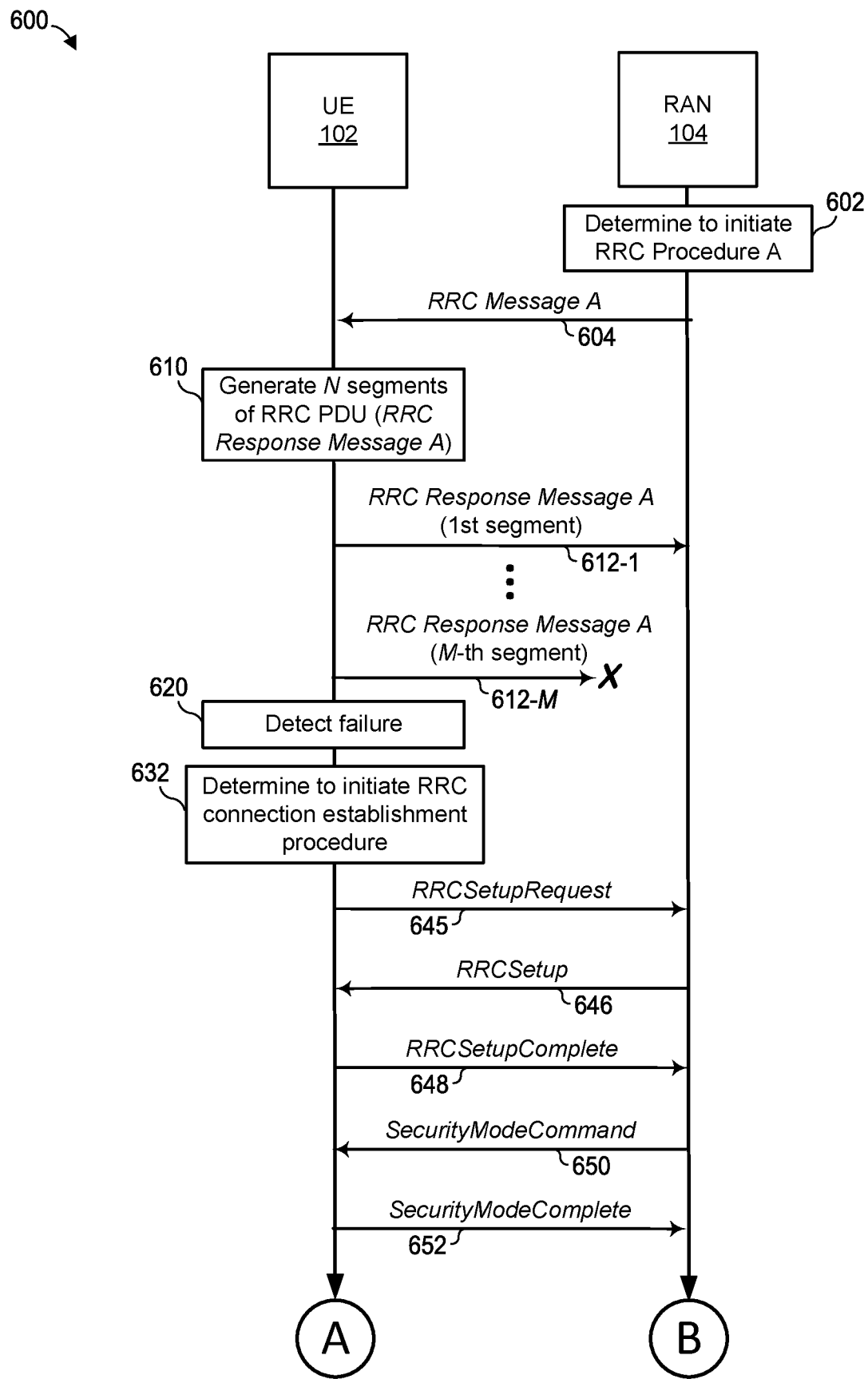
Figure 6B:
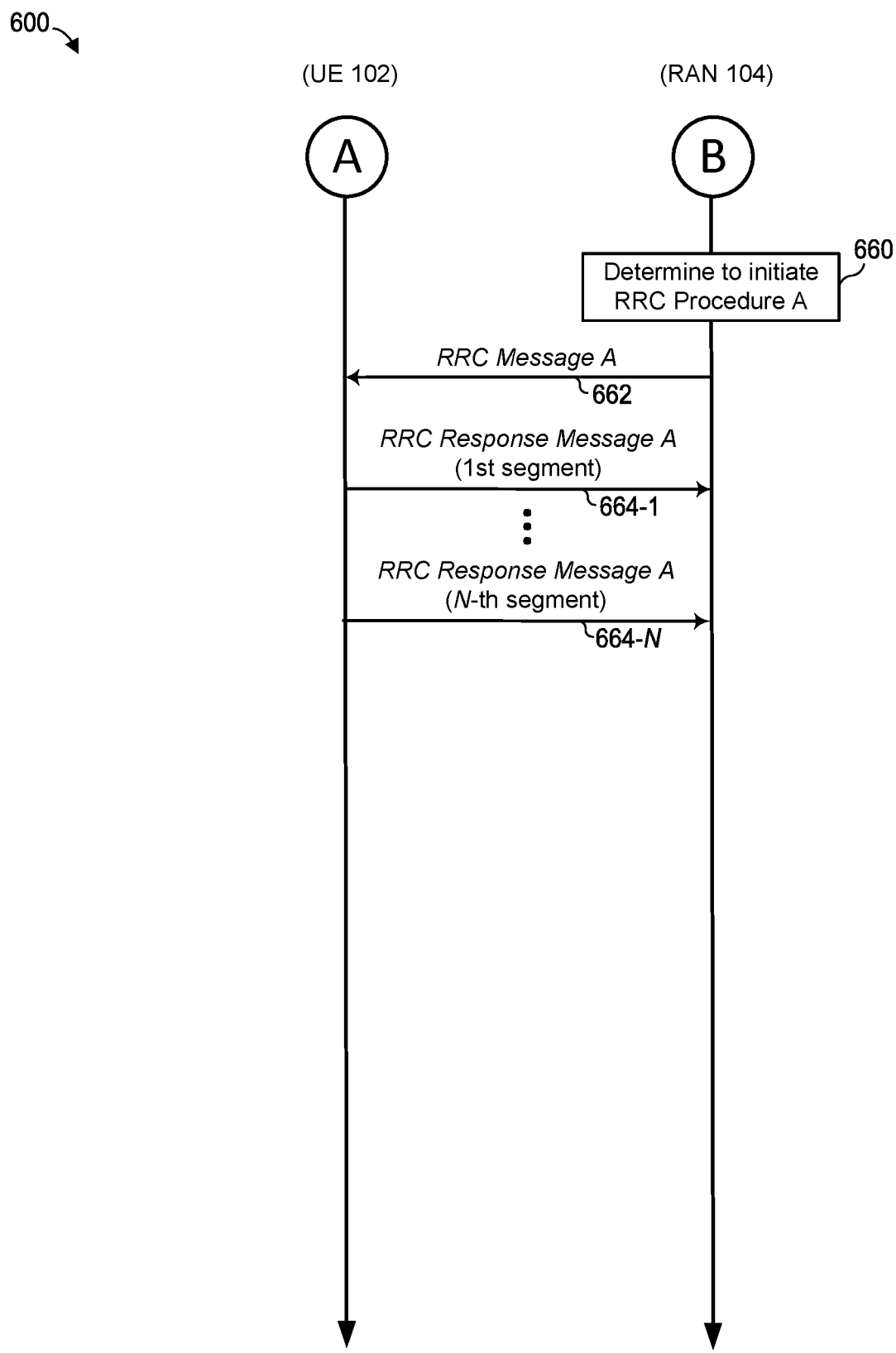

FIGS. 6A and 6B depict an example messaging diagram 600 that corresponds to yet another implementation and/or scenario. In particular, and as discussed further below, the messaging diagram 600 may reflect an implementation and/or scenario in which, after radio link failure, the UE 102 determines to initiate an RRC connection establishment procedure rather than an RRC connection reestablishment procedure. The messaging diagram 600 may reflect the same implementation of the wireless communication network 100 as the messaging diagrams 200, 300, 400 and/or 500, for example, but in a different scenario (e.g., where certain conditions cause the UE 102 to decide to establish a new RRC connection). In the messaging diagram 600, all operations shown for the UE 102 may be performed by (or triggered by, e.g., in the case of message transmission) the RRC controller 122 of the UE 102. Similarly, the operations shown for the RAN 104 may be performed by (or triggered by) the RRC controller 162 of the base station 104-1, or a similar RRC controller of the base station 104-2.

At the start of the messaging diagram 600, the UE 102 and the RAN 104 have already established an RRC connection. As seen in FIG. 6A, the RAN 104 determines 602 to initiate RRC Procedure A (e.g., a UE capability transfer procedure), and then transmits 604 RRC Message A (e.g., a UECapabilityEnquiry message) to the UE 102. In response, the UE 102 generates 610 all N segments of the RRC PDU containing N respective segments of RRC Response Message A, and sequentially transmits (612-1 through 612-M) the first M segments of the N segments to the RAN 104. The generating 610 and transmitting 612 operations may occur during two distinct time periods or in an interleaved manner (e.g., as discussed above for the generating 210 and transmitting 212 operations of FIG. 2). In the depicted scenario, a radio link failure causes the RAN 104 to fail to successfully receive the M-th segment (i.e., L=M−1). The UE 102 detects 620 the failure (e.g., as discussed above with reference to FIG. 2) and, in response, determines 632 to initiate an RRC connection establishment procedure with the RAN 104.

Thereafter, the UE 102 transmits 645 an RRCSetupRequest message to the RAN 104. In response, the RAN 104 transmits 646 an RRCSetup message to the UE 102, and the UE 102 responds to the RRCSetup message by transmitting 648 an RRCSetupComplete message to the RAN 104. Thereafter, the RAN 104 transmits 650 a SecurityModeCommand message to the UE 102 (e.g., to activate integrity protection, encryption, and/or other security schemes for communications between the RAN 104 and the UE 102), and the UE 102 responds by transmitting 652 a SecurityModeComplete message to the RAN 104.

Referring now to FIG. 6B, the RAN 104 then determines 660 to initiate the RRC Procedure A (e.g., the UE capability transfer procedure), and transmits 662 another RRC Message A (e.g., another UECapabilityEnquiry message) to the UE 102. In response to RRC Message A, the UE 102 sequentially transmits (664-1 through 664-N) all N segments of RRC Response Message A (e.g., the UECapabilityInformation message) to the RAN 104. Thus, despite the radio link failure, the RAN 104 can receive all segments and assemble the complete RRC PDU containing RRC Response Message A.

In some implementations and/or scenarios, all operations of the RAN 104 shown in FIGS. 6A and 6B are performed by the base station 104-1. In other implementations and/or scenarios, however, the UE 102 connects to a new base station in response to the radio link failure. In such an implementation/scenario, all operations of the RAN 104 shown in FIGS. 6A and 6B that occur prior to the radio link failure are performed by the base station 104-1, while those that occur after the radio link failure are performed by the base station 104-2. As will be seen in the discussion of FIGS. 7A and 7B, however, other post-failure operations of the RAN 104 (not shown in FIGS. 6A and 6B) may be performed by the base station 104-1.

Figure 7A:
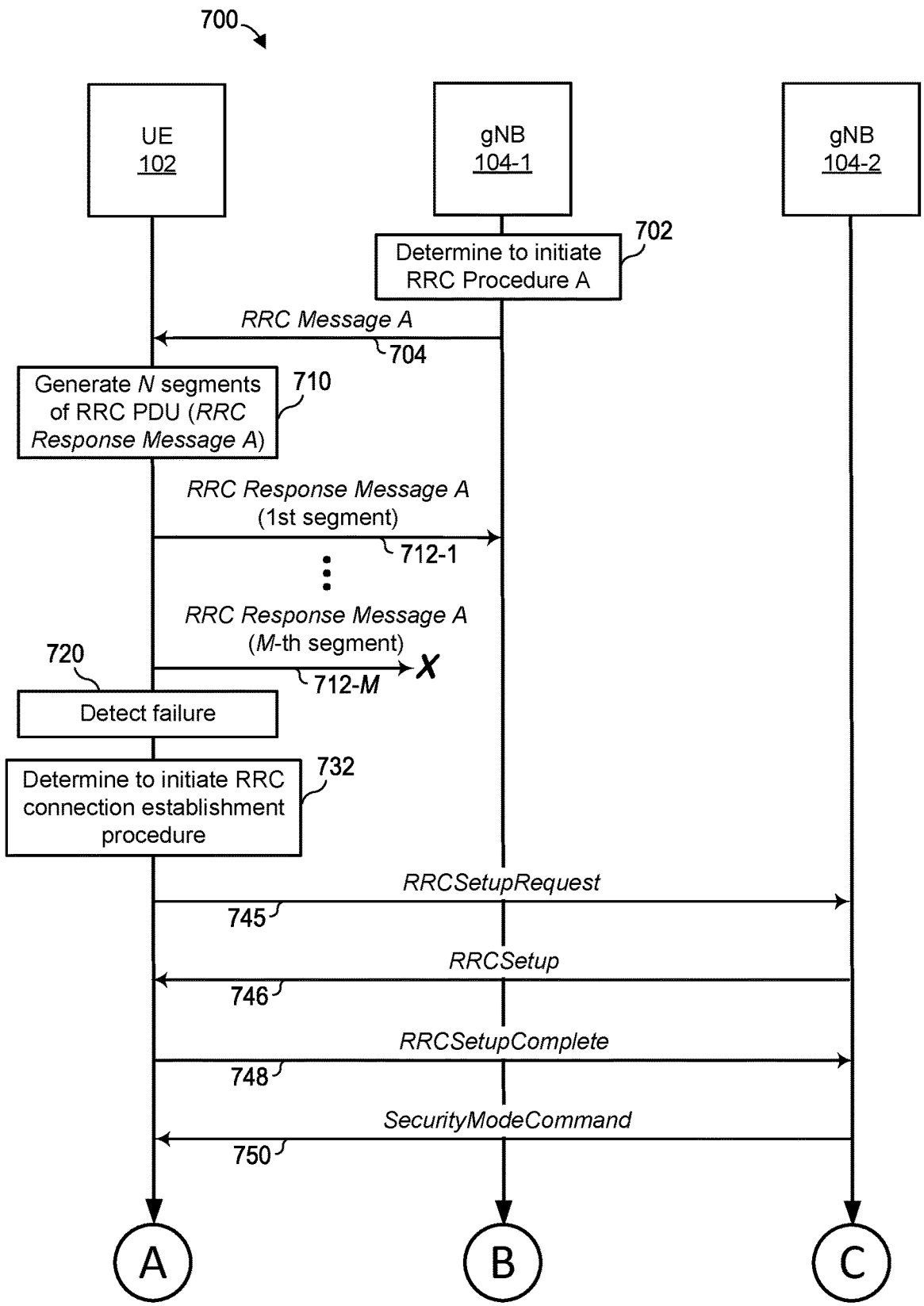
Figure 7B:
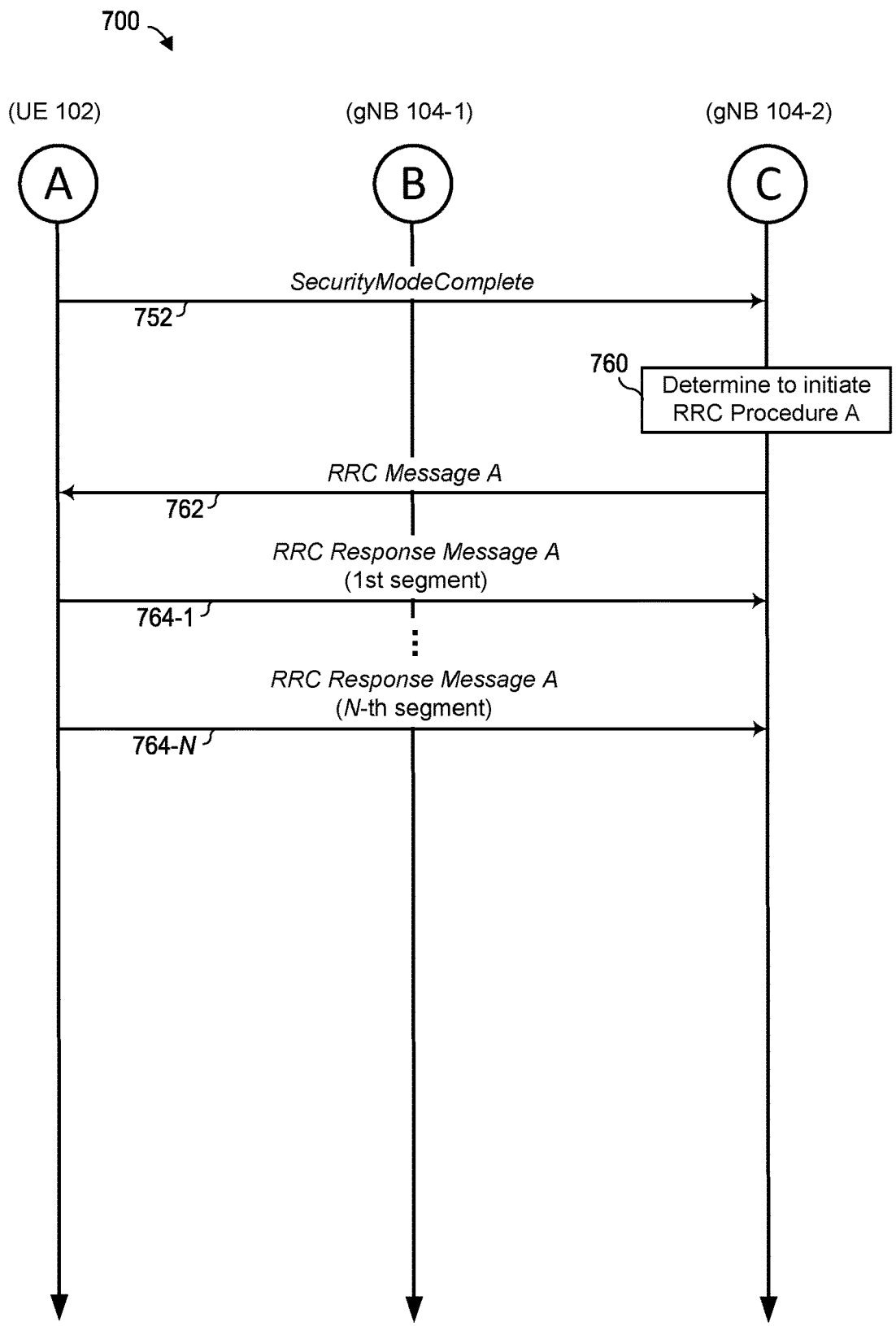

One implementation/scenario in which the UE 102 connects to a new base station in response to the radio link failure is shown in the messaging diagram 700 of FIGS. 7A and 7B. In the messaging diagram 700, all operations shown for the UE 102 may be performed by (or triggered by, e.g., in the case of message transmission) the RRC controller 122 of the UE 102. Similarly, the operations shown for the base station 104-1 may be performed by (or triggered by) the RRC controller 162, and the operations shown for the base station 104-2 may be performed by (or triggered by) an RRC controller of the base station 104-2 that is similar to the RRC controller 162.

At the start of the messaging diagram 700, the UE 102 and the base station 104-1 have already established an RRC connection. As seen in FIG. 7A, the base station 104-1 determines 702 to initiate RRC Procedure A (e.g., a UE capability transfer procedure), and then transmits 704 RRC Message A (e.g., a UECapabilityEnquiry message) to the UE 102. In response, the UE 102 generates 710 all N segments of the RRC PDU containing N respective segments of RRC Response Message A, and sequentially transmits (712-1 through 712-M) the first M segments of the N segments to the base station 104-1. The generating 710 and transmitting 712 operations may occur during two distinct time periods or in an interleaved manner (e.g., as discussed above for the generating 210 and transmitting 212 operations of FIG. 2). In the depicted scenario, a radio link failure causes the base station 104-1 to fail to successfully receive the M-th segment (i.e., L=M−1). The UE 102 detects 720 the failure (e.g., as discussed above with reference to FIG. 2) and, in response, determines 732 to initiate an RRC connection establishment procedure with a new base station (i.e., the base station 104-2). The UE 102 then transmits 745 an RRCSetupRequest message to the base station 104-2, and the base station 104-2 responds by transmitting 746 an RRCSetup message to the UE 102.

The UE 102 responds to the RRCSetup message by transmitting 748 an RRCSetupComplete message to the base station 104-2, after which the base station 104-2 transmits 750 a SecurityModeCommand message to the UE 102 (e.g., to activate integrity protection, encryption, and/or other security schemes for communications between the base station 104-2 and the UE 102). Referring now to FIG. 7B, the UE 102 responds to the SecurityModeCommand message by transmitting 752 a SecurityModeComplete message to the base station 104-2.

Next, the base station 104-2 determines 760 to initiate the RRC Procedure A (e.g., the UE capability transfer procedure), and transmits 762 another RRC Message A (e.g., another UECapabilityEnquiry message) to the UE 102. In response to RRC Message A, the UE 102 sequentially transmits (764-1 through 764-N) all N segments of RRC Response Message A (e.g., the UECapabilityInformation message) to the base station 104-2. Thus, despite the radio link failure, and despite not receiving any segments from the base station 104-1, the base station 104-2 can receive all segments and assemble the complete RRC PDU containing RRC Response Message A.

Figure 8:
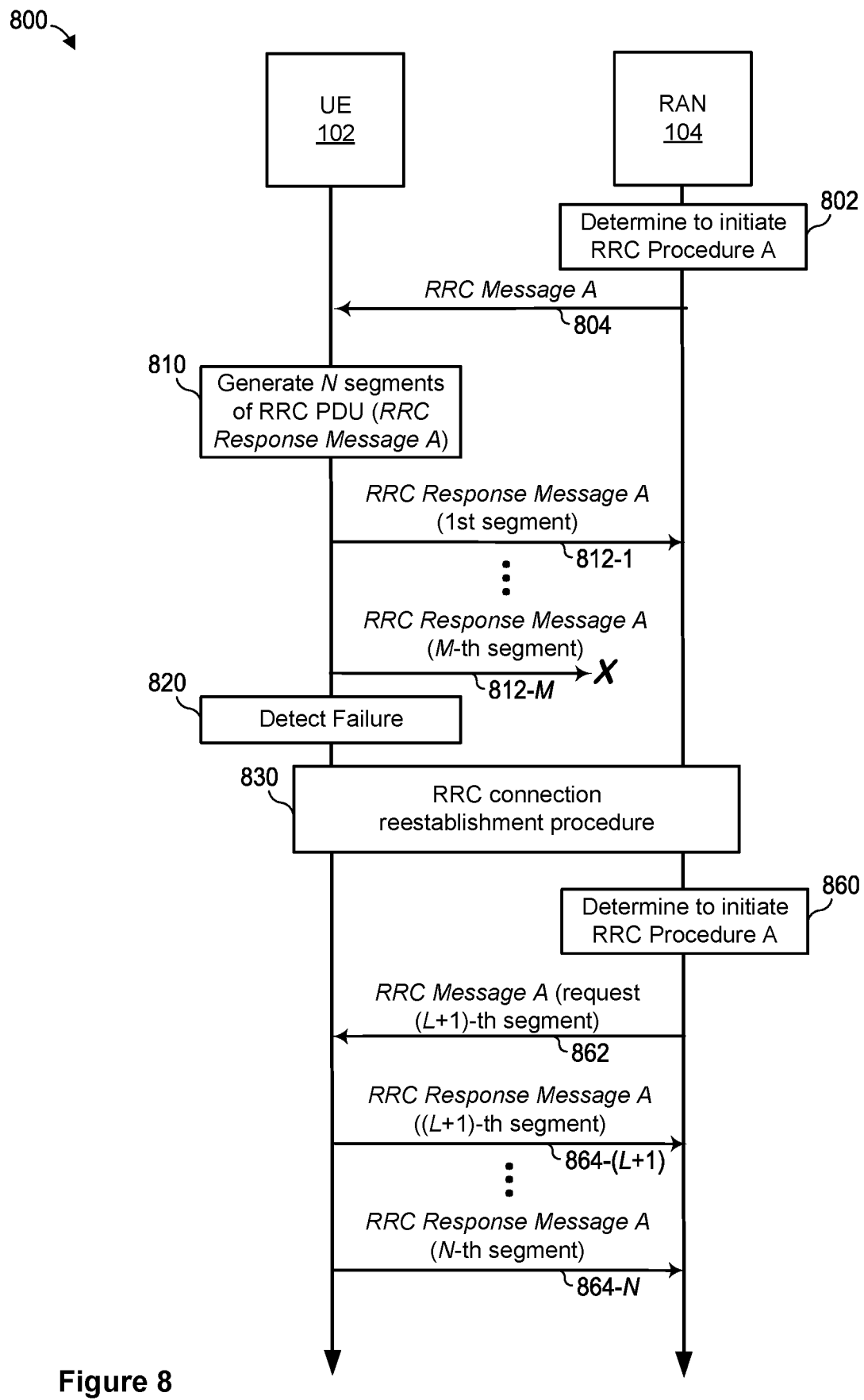

FIGS. 8 and 9 reflect a different implementation than FIGS. 2 through 7. In particular, FIGS. 8 and 9 reflect an implementation in which the UE 102 does not re-transmit every one of the first M segments of RRC Message A to the RAN 104, thereby decreasing the amount of required messaging, but without causing segments to be lost (as will become clear from the following discussion).

Referring first to FIG. 8, a messaging diagram 800 depicts example messages that may be exchanged between the UE 102 and the RAN 104 of FIG. 1, and associated operations, according to one implementation and scenario. In the messaging diagram 800, all operations shown for the UE 102 may be performed by (or triggered by, e.g., in the case of message transmission) the RRC controller 122 of the UE 102. Similarly, the operations shown for the RAN 104 may be performed by (or triggered by) the RRC controller 162 of the base station 104-1, or a similar RRC controller of the base station 104-2.

At the start of the messaging diagram 800, the UE 102 and the RAN 104 have already established an RRC connection. As seen in FIG. 8, the RAN 104 determines 802 to initiate RRC Procedure A (e.g., a UE capability transfer procedure), and then transmits 804 RRC Message A (e.g., a UECapabilityEnquiry message) to the UE 102. In response, the UE 102 generates 810 all N segments of the RRC PDU containing N respective segments of RRC Response Message A, and sequentially transmits (812-1 through 812-M) the first M segments of the N segments to the RAN 104. The generating 810 and transmitting 812 operations may occur during two distinct time periods or in an interleaved manner (e.g., as discussed above for the generating 210 and transmitting 212 operations of FIG. 2). In the depicted scenario, a radio link failure causes the RAN 104 to fail to successfully receive at least the M-th segment. That is, the RAN 104 successfully receives only the first L segments, where 0<L<M≤N. The UE 102 detects 820 the failure (e.g., as discussed above with reference to FIG. 2), but does not know how many segments the RAN 104 successfully received prior to the failure (i.e., does not know the value of L).

In response to the failure, the UE 102 and the RAN 104 perform 830 an RRC connection reestablishment procedure. After the UE 102 and RAN 104 reestablish the RRC connection, the RAN 104 determines 860 to initiate the same RRC Procedure A, and therefore transmits 862 another RRC Message A (e.g., another UECapabilityEnquiry message) to the UE 102. In this RRC Message A, however, the RAN 104 includes a request for the (L+1)-th segment of the RRC PDU (i.e., the (L+1)-th segment of RRC Response Message A). The request may take any suitable form that can convey to the UE 102 that the RAN 104 still needs the (L+1)-th through N-th segments. For example, the request may include a field with a value equal to L+1 (representing the next segment that the RAN 104 needs in the sequence of segments), a field with a value equal to L (indicating the last segment that the RAN 104 successfully received), a field with a value equal to N−L (indicating the number of segments at the end of the RRC PDU that the RAN 104 still needs), and so on.

In response to receiving and processing this RRC Message A, including the request for the L-th segment, the UE 102 sequentially transmits (864-(L+1) through 864-N) the (L+1)-th through N-th segments of the RRC Response Message A to the RAN 104. Thus, despite the radio link failure, and despite the UE 102 not re-transmitting at least some of the first M segments, the RAN 104 can successfully receive all N segments, and assemble all N segments into the complete RRC PDU.

In some implementations and/or scenarios, all operations of the RAN 104 shown in FIG. 8 are performed by the base station 104-1. In other implementations and/or scenarios, however, the UE 102 connects to a new base station in response to the radio link failure. In such an implementation/scenario, all operations of the RAN 104 shown in FIG. 8 that occur prior to the RRC connection reestablishment procedure are performed by the base station 104-1, while those that occur after the RRC connection reestablishment procedure (and at least some operations of the RRC connection reestablishment procedure itself) are performed by the base station 104-2.

Figure 9A:
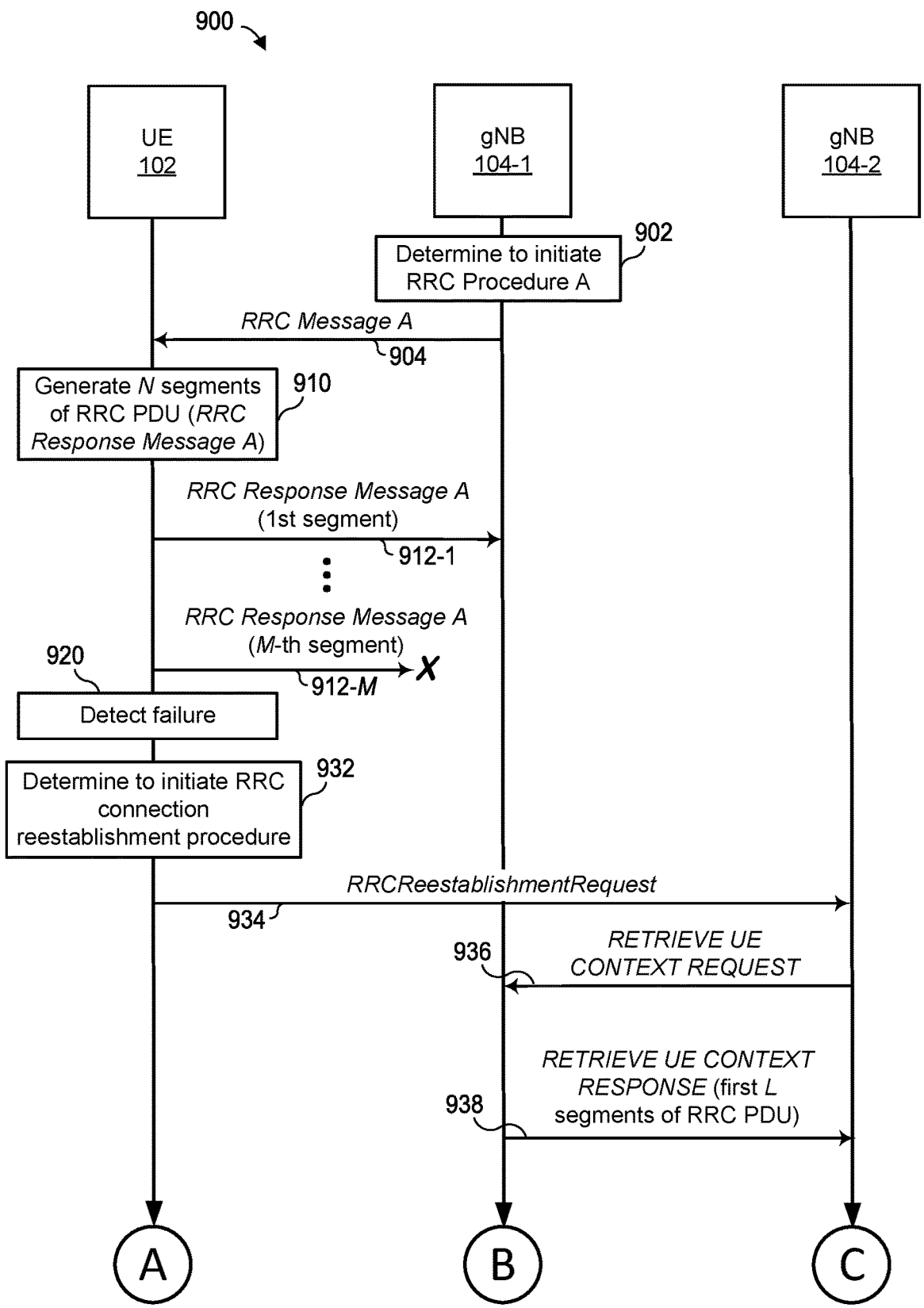
Figure 9B:
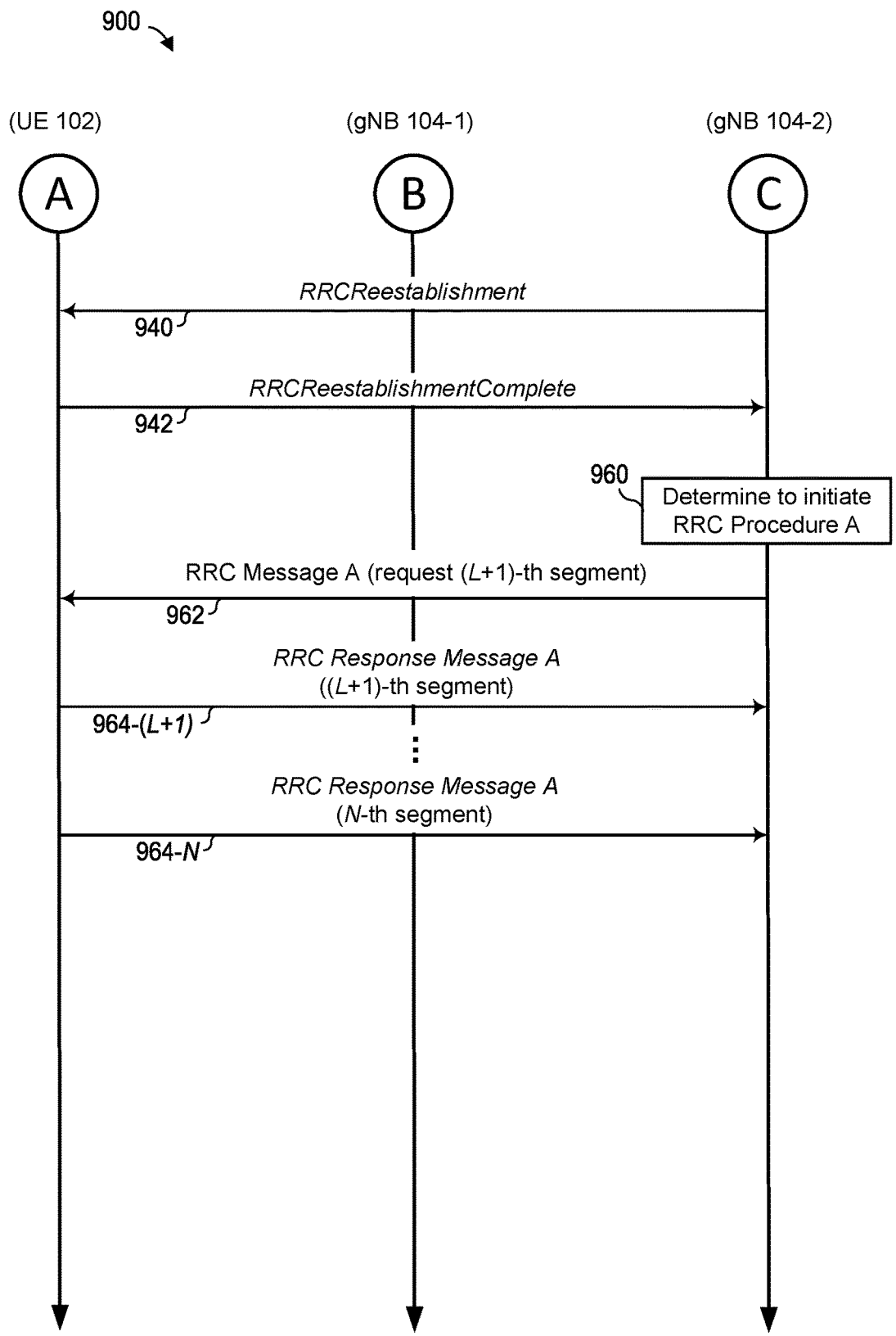

One of these latter implementations/scenarios is shown in the messaging diagram 900 of FIGS. 9A and 9B. In the messaging diagram 900, all operations shown for the UE 102 may be performed by (or triggered by, e.g., in the case of message transmission) the RRC controller 122 of the UE 102. Similarly, with the possible exception of the communications between the base stations 104-1 and 104-2, the operations shown for the base station 104-1 may be performed by (or triggered by) the RRC controller 162, and the operations shown for the base station 104-2 may be performed by (or triggered by) an RRC controller of the base station 104-2 that is similar to the RRC controller 162.

At the start of the messaging diagram 900, the UE 102 and the base station 104-1 have already established an RRC connection. As seen in FIG. 9A, the base station 104-1 determines 902 to initiate RRC Procedure A (e.g., a UE capability transfer procedure), and then transmits 904 RRC Message A (e.g., a UECapabilityEnquiry message) to the UE 102. In response, the UE 102 generates 910 all N segments of the RRC PDU containing N respective segments of RRC Response Message A, and sequentially transmits (912-1 through 912-M) the first M segments of the N segments to the base station 104-1. The generating 910 and transmitting 912 operations may occur during two distinct time periods or in an interleaved manner (e.g., as discussed above for the generating 210 and transmitting 212 operations of FIG. 2). In the depicted scenario, a radio link failure causes the base station 104-1 to fail to successfully receive at least the M-th segment. That is, the base station 104-1 successfully receives only the first L segments, where 0<L<M≤N. The UE 102 detects 920 the failure (e.g., as discussed above with reference to FIG. 2), but does not know how many segments the base station 104-1 successfully received prior to the failure (i.e., does not know the value of L). In response to detecting the failure, the UE 102 determines 932 to initiate an RRC connection reestablishment procedure with a new base station (i.e., the base station 104-2). The UE 102 then transmits 934 an RRCReestablishmentRequest message to the base station 104-2.

If the base station 104-2 does not have context information for the UE 102 (e.g., the "UE Context" as defined by the 5G specification) when receiving the RRCReestablishmentRequest message from the UE 102, the base station 104-2 transmits 936 a RETRIEVE UE CONTEXT REQUEST message to the base station 104-1, and the base station 104-1 responds by transmitting 938 to the base station 104-2 the context information for the UE 102 in a RETRIEVE UE CONTEXT RESPONSE message. The base station 104-1 includes the successfully received segments of the RRC PDU (i.e., the first L segments) in the RETRIEVE UE CONTEXT RESPONSE message. In some implementations, the base station 104-1 includes not only the segments themselves, but also an indication of the number of segments received, in the RETRIEVE UE CONTEXT RESPONSE message. For example, the base station 104-1 may include in the message a field containing the number L (the number of segments successfully received by base station 104-1), the number L+1 (the number of the next segment that will be needed by base station 104-2), or another suitable indicator of how many segments were successfully received by the base station 104-1.

Referring now to FIG. 9B, the base station 104-2 transmits 940 an RRCReestablishment message to the UE 102, and the UE 102 responds by transmitting 942 an RRCReestablishmentComplete message to the base station 104-2. Thereafter, the base station 104-2 determines 960 to initiate the RRC Procedure A (e.g., the UE capability transfer procedure), and transmits 962 another RRC Message A (e.g., another UECapabilityEnquiry message) to the UE 102. In this RRC Message A, however, the base station 104-2 includes a request for the (L+1)-th segment of the RRC PDU (i.e., the (L+1)-th segment of RRC Response Message A). As noted above in connection with FIG. 8, the request may take any suitable form that can convey to the UE 102 that the base station 104-2 still needs the (L+1)-th through the N-th segments.

In response to receiving and processing this RRC Message A, including the request for the (L+1)-th segment, the UE 102 sequentially transmits (964-(L+1) through 964-N) the (L+1)-th through N-th segments of the RRC Response Message A to the base station 104-2. Thus, despite the radio link failure, and despite the UE 102 not re-transmitting at least some of the first M segments, the base station 104-2 can successfully receive all N segments, and assemble all N segments into the complete RRC PDU.

As noted throughout the above discussion, in any of the implementations and scenarios of FIGS. 2-9, the RRC Message A may be a UECapabilityEnquiry message and the RRC Response Message A may be a UECapabilityInformation message. Moreover, in some implementations, the RRC PDU may be a UL-DCCH-MESSAGE that includes the UECapabilityInformation message. Alternatively, the RRC PDU may be the UECapabilityInformation message itself.

In still other implementations, the RRC Procedure A may be a UE Information procedure (e.g., as defined by the 5G specification), in which case the RRC Message A may be a UEInformationRequest message and the RRC Response Message A may be a UEInformationResponse message. In one such implementation, the RRC PDU may be a UL-DCCH-MESSAGE that includes the UEInformationResponse message. Alternatively, the RRC PDU may be the UEInformationResponse message itself.

Further, in some implementations, the RRC Message A may include information (e.g., a field or an information element) indicating that the UE 102 is permitted to transmit the RRC Response Message A (e.g., the UE capabilities) in segments. If the UE 102 receives an RRC Message A that does not include that information element, the UE 102 cannot segment the RRC Response Message A (e.g., such that transmission 212-1, 312-1, 412-1, 512-1, 612-1, 712-1, 812-1 or 912-1 must include the entire RRC Response Message A).

Additionally, in some implementations, the RRC Message A may include a transaction identifier and the RRC Response Message A may include the same transaction identifier. Each RRC Message A may include a different transaction identifier, and each RRC Response Message A may include the same transaction identifier as the corresponding RRC Message A. Moreover, each segment of an RRC Response Message A may include the same transaction identifier. In one implementation, each segment of an RRC Response Message A (or each segment of an RRC PDU including the RRC Response Message A) may include a segment number indicating an order of the segment in the sequence. In this implementation, the UE 102 may be allowed to transmit segments of the RRC Response Message A (or segments of an RRC PDU including the RRC Response Message A) out of sequence. In another implementation, the last segment of an RRC Response Message A may include an indication that the segment is the last segment.

Further, in some implementations, the UE 102 includes each segment of the RRC Response Message A (or each segment of an RRC PDU including the RRC Response Message A) in a new RRC message. In one implementation, the new RRC message may include a segment number indicating an order of the segment in the sequence. In this implementation, the UE 102 may be allowed to transmit segments of the RRC Response Message A (or segments of an RRC PDU including the RRC Response Message A) out of sequence. In another implementation, a new RRC message includes the last segment of the RRC Response Message A (or the last segment of an RRC PDU including the RRC Response Message A), and also includes an indication that the new RRC message includes the last segment of the RRC Response Message A. In other implementations, instead of utilizing a new RRC message, the UE 102 includes an indication of each segment number of the RRC Response Message A (or each segment number of an RRC PDU including the RRC Response Message A) in the RRC Response Message A, e.g., by using a critical extensions field/information element of the RRC Response Message A.

Also in any of the implementations and scenarios discussed above in connection with FIGS. 2-9, the RAN 104 may utilize transaction identifiers to determine which RRC response messages (e.g., RRC Response Message A) transmitted by the UE 102 correspond to which RRC messages (e.g., RRC Message A) transmitted by the RAN 104. In some implementations, for example, the RAN 104 (e.g., base station 104-1) sets a transaction identifier to a first value, and includes the transaction identifier in the first RRC Message A (e.g., in transmission 204, 304, 404, 504, 604, 704, 804 or 904). In response, the UE 102 sets a transaction identifier to the first value, and includes the transaction identifier somewhere in the RRC Response Message A (e.g., for transmission 212, 312, 412, 512, 612, 712, 812 or 912). By inspecting this transaction indicator, the RAN 104 (e.g., base station 104-1) may determine that the RRC Response Message A belongs to the same transaction as the first RRC Message A.

Alternatively, the UE 102 may include the transaction indicator in each segment of RRC Response Message A, such that the RAN 104 (e.g., base station 104-1) may determine that each segment of the RRC Response Message A belongs to the same transaction as the first RRC Message A. In still other implementations, the UE 102 does not include the transaction indicator associated with the RRC Message A in any segment of the RRC Response Message A. For example, the UE 102 may include a different transaction indicator/value in RRC Response Message A or its segments, or may not include any transaction indicator. In these implementations, the RAN 104 may not know that the RRC Response Message A (or the segments thereof) and the RRC Message A belong to the same transaction until and unless the RAN 104 assembles all of the segments into the complete RRC PDU and subsequently obtains the RRC Response Message A from the RRC PDU. In some of the implementations described above, the RAN 104 is unable to assemble segments of an RRC Response Message A that include different transaction indicators.

Also, in any of the scenarios discussed above that involve a complete RRC connection reestablishment procedure, the RAN 104 (e.g., base station 104-2) may transmit an RRCReconfiguration message to the UE 102 before transmitting the second RRC Message A to the UE 102 (e.g., in transmission 362 or 962), and after transmitting an RRCReestablishment message to the UE 102 (e.g., in transmission 340 or 940). The UE 102 may then respond by transmitting an RRCReconfigurationComplete message to the UE RAN 104 (e.g., the base station 104-2), e.g., as in transmission 342 or 942. The RAN 104 (e.g., the base station 104-2) may then transmit the second RRC Message A to the UE 102 (e.g., in transmission 362 or 962) after receiving the RRCReconfigurationComplete message.

Figure 10:
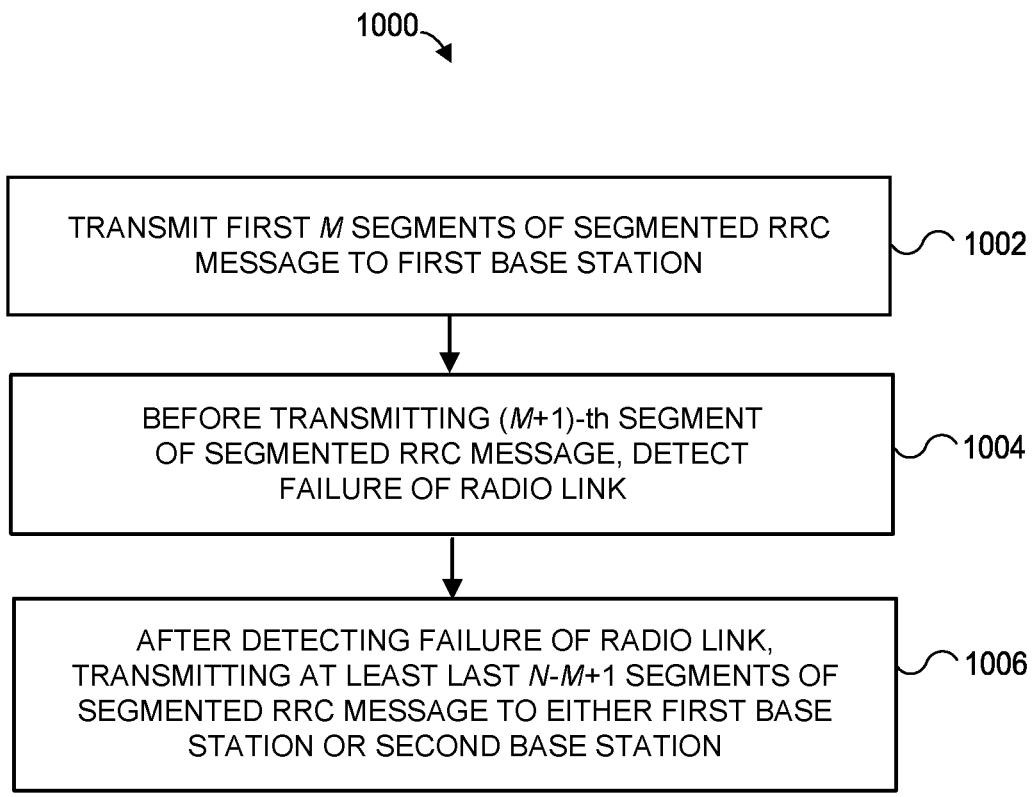
FIG. 10 is a flow diagram of an example method for managing communication of a segmented RRC message that includes N segments, from a user device perspective.

Referring now to FIG. 10, an example method 1000 for managing communication of a segmented RRC message can be implemented in a user device (e.g., by processing hardware 120 of the UE 102) configured to communicate with a first base station (e.g., the base station 104-1) via a radio link. In the method 1000, the segmented RRC message includes N segments (e.g., within N respective segments of an RRC PDU), where N is an integer greater than one. The segmented RRC message may be a message indicating capabilities of the user device (e.g., a UECapabilityInformation message), for example.

At block 1002 of the method 1000, the user device transmits the first M segments of the segmented RRC message to the first base station, where M is an integer greater than zero and less than N. As a more specific example, the transmission may include the transmissions 212-1 through 212-M of FIG. 2, the transmissions 312-1 through 312-M of FIG. 3A, the transmissions 412-1 through 412-M of FIG. 4A, the transmissions 512-1 through 512-M of FIG. 5A, the transmissions 612-1 through 612-M of FIG. 6A, the transmissions 712-1 through 712-M of FIG. 7A, the transmissions 812-1 through 812-M of FIG. 8, or the transmissions 912-1 through 912-M of FIG. 9A.

At block 1004, before transmitting the (M+1)-th segment of the segmented RRC message, the user device detects a failure of the radio link. As a more specific example, the detection may include the detection 220 of FIG. 2, the detection 320 of FIG. 3A, the detection 420 of FIG. 4A, the detection 520 of FIG. 5A, the detection 620 of FIG. 6A, the detection 720 of FIG. 7A, the detection 820 of FIG. 8, or the detection 920 of FIG. 9A. The user device may detect the failure almost immediately after the failure occurs, or after some delay. Thus, the first base station may fail to receive only the M-th segment transmitted by the user device, or may fail to receive multiple segments transmitted by the user device. In either case, the user device may be unaware of how many segments the first base station failed to receive.

At block 1006, after detecting the failure of the radio link, the user device transmits at least the last N−M+1 segments of the segmented RRC message to either the first base station or a second base station (e.g., the base station 104-1 or the base station 104-2). As a more specific example, the transmission may include the transmissions 264-1 through 264-N of FIG. 2, the transmissions 364-1 through 364-N of FIG. 3B, the transmissions 464-1 through 464-N of FIG. 4B, the transmissions 564-1 through 564-N of FIG. 5B, the transmissions 664-1 through 664-N of FIG. 6B, the transmissions 764-1 through 764-N of FIG. 7B, the transmissions 864-(L+1) through 864-N of FIG. 8, or the transmissions 964-(L+1) through 964-N of FIG. 9B.

In some implementations and/or scenarios, the method 1000 includes one or more additional blocks not shown in FIG. 10. For example, the method 1000 may include an additional block, occurring before block 1006, in which the user device receives, from the first base station or the second base station, an RRC message indicating that the first base station received the first L segments of the segmented RRC message, where L is an integer greater than zero and less than M. In this implementation/scenario, block 1006 may include transmitting only the last N-L segments of the segmented RRC message, and may occur in response to receiving the RRC message from the first or second base station. As a more specific example, the RRC message that the user device receives from the first or second base station may be the RRC Message A transmitted in transmission 862 of FIG. 8 or transmission 962 of FIG. 9B.

As another example, the method 1000 may include, before block 1002, an additional block in which the user device receives an RRC message from the first base station via the radio link, and block 1002 may occur in response to the user device receiving the RRC message. As a more specific example, the RRC message that the user device receives from the first base station may be the RRC Message A transmitted in transmission 204 of FIG. 2, transmission 304 of FIG. 3A, transmission 404 of FIG. 4A, transmission 504 of FIG. 5A, transmission 604 of FIG. 6A, transmission 704 of FIG. 7A, transmission 804 of FIG. 8, or transmission 904 of FIG. 9A.

As another example, the method 1000 may include an additional block in which the user device, in response to detecting the failure of the radio link at block 1004, initiates (with either the first or second base station) either an RRC connection reestablishment procedure or an RRC connection establishment procedure. In such an implementation, block 1006 may occur after the user device and the first or second base station establish or reestablish an RRC connection. As a more specific example, the user device may initiate the RRC connection establishment or reestablishment procedure via the transmission 334 of FIG. 3A or the transmission 934 of FIG. 9A.

Figure 11:
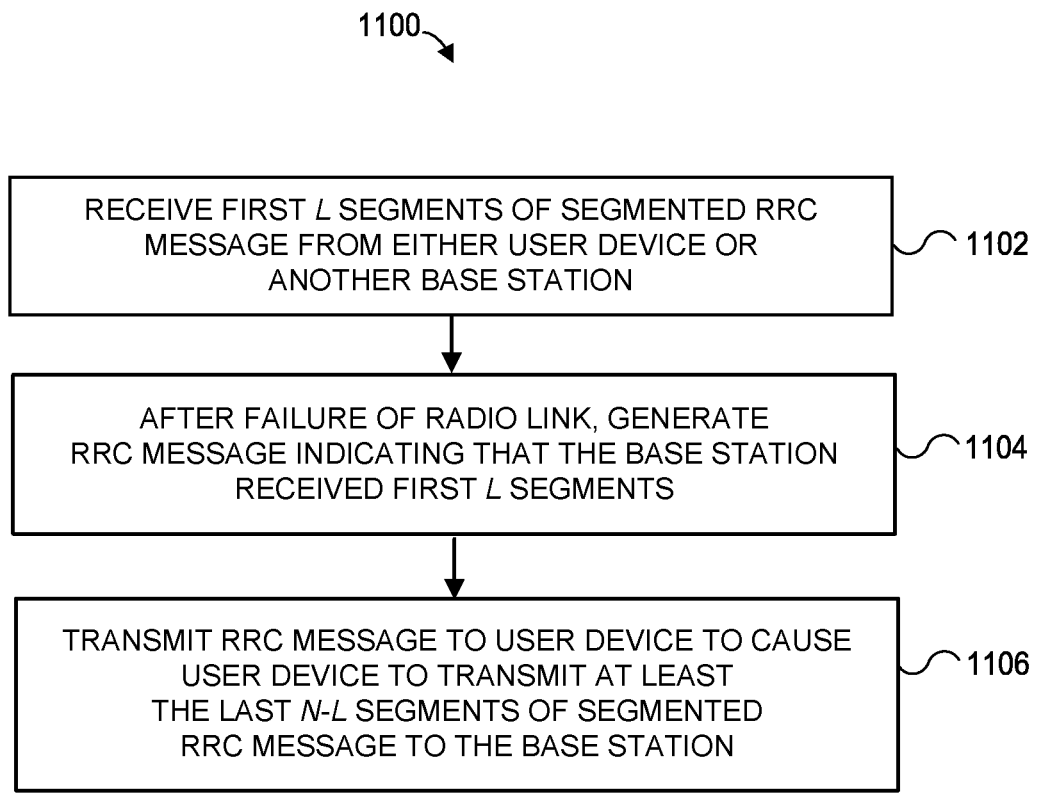
FIG. 11 is a flow diagram of an example method for managing communication of a segmented RRC message that includes N segments, from a base station perspective.

Referring now to FIG. 11, an example method 1100 for managing communication of a segmented RRC message can be implemented in a base station (e.g., by processing hardware 160 of the base station 104-1 or similar processing hardware of the base station 104-2) configured to communicate with a user device (e.g., the UE 102) via a radio link. In the method 1100, the segmented RRC message includes N segments (e.g., within N respective segments of an RRC PDU), where N is an integer greater than one. The segmented RRC message may be a message indicating capabilities of the user device (e.g., a UECapabilityInformation message), for example.

At block 1102 of the method 1100, the base station receives the first L segments of the segmented RRC message from either the user device or another base station, where L is an integer greater than zero and less than N. As a more specific example, in an implementation and/or scenario where the base station receives the first L segments from the user device, the base station may receive the L segments in the transmissions 812-1 through 812-L of FIG. 8 or the transmissions 912-1 through 912-L of FIG. 9A (where it is understood that L is less than M). As another example, in implementations and/or scenarios where the base station instead receives the first L segments from another base station, the base station may receive the L segments in the transmission 938 of FIG. 9A.

At block 1104, after a failure of the radio link, the base station generates an RRC message indicating that the base station received the first L segments. For example, the RRC message may specify the number L (the last successfully received segment), or the number L+1 (the next segment that the base station needs), etc. Block 1104 may occur after the user device and the base station establish or reestablish an RRC connection, for example.

At block 1106, the base station transmits the RRC message to the user device to cause the user device to transmit at least the last N-L segments of the segmented RRC message to the base station. As a more specific example, the transmission by the base station may be the transmission 862 of FIG. 8 or the transmission 962 of FIG. 9B, and the triggered transmission (by the user device) may include the transmissions 864-(L+1) through 864-N of FIG. 8 or the transmissions 964-(L+1) through 964-N of FIG. 9B.

In some implementations and/or scenarios, the method 1100 includes one or more additional blocks not shown in FIG. 11. For example, the method 1100 may include an additional block, occurring before block 1102, in which the base station transmits, to the user device, an RRC request message that requests the segmented RRC message. As a more specific example, the transmission may be the transmission 804 of FIG. 8 or the transmission 904 of FIG. 9A.

By way of example, and not limitation, the disclosure herein contemplates at least the following aspects:

Aspect 1—A method, in a user device configured to communicate with a first base station via a radio link, for managing communication of a segmented radio resource control (RRC) message that includes N segments, the method comprising: transmitting a first M segments of the segmented RRC message to the first base station, M being an integer greater than zero and less than N; detecting, by processing hardware of the user device and before transmitting an (M+1)-th segment of the segmented RRC message, a failure of the radio link; and after detecting the failure of the radio link, transmitting at least a last N−M+1 segments of the segmented RRC message to either the first base station or a second base station.

Aspect 2—The method of aspect 1, wherein transmitting at least the last N−M+1 segments of the segmented RRC message includes transmitting the N segments.

Aspect 3—The method of aspect 1, wherein transmitting at least the last N−M+1 segments of the segmented RRC message includes transmitting only a subset of the N segments.

Aspect 4—The method of aspect 1, further comprising: before transmitting at least the last N−M+1 segments, receiving, from the first base station or the second base station, an RRC message indicating that the first base station received a first L segments of the segmented RRC message, L being an integer greater than zero and less than M, wherein transmitting at least the last N−M+1 segments includes transmitting only a last N-L segments of the segmented RRC message, and occurs in response to receiving the RRC message.

Aspect 5—The method of any one of aspects 1 through 4, further comprising: receiving an RRC message from the first base station via the radio link, wherein transmitting the first M segments occurs in response to receiving the RRC message.

Aspect 6—The method of aspect 5, wherein: the RRC message is a message requesting user device capability information; and the segmented RRC message is a message indicating capabilities of the user device.

Aspect 7—The method of aspect 5 or 6, further comprising: after detecting the failure of the radio link, receiving an additional RRC message from the first base station or the second base station, wherein transmitting at least the last N−M+1 segments occurs in response to receiving the additional RRC message.

Aspect 8—The method of any one of aspects 1 through 7, wherein the segmented RRC message is included in a segmented RRC protocol data unit (PDU).

Aspect 9—The method of any one of aspects 1 through 8, further comprising: in response to detecting the failure of the radio link, initiating, with either the first base station or the second base station, either an RRC connection reestablishment procedure or an RRC connection establishment procedure, wherein transmitting at least the last N−M+1 segments occurs after the user device and either the first base station or the second base station establish or reestablish an RRC connection.

Aspect 10—The method of any one of aspects 1 through 9, wherein: transmitting the first M segments includes, for each segment of the first M segments, transmitting a message including the segment and a segment number indicating an order of the segment in the segmented RRC message; and transmitting at least the last N−M+1 segments includes, for each segment of at least an (M+1)-th segment through an (N−1)-th segment of the segmented RRC message, transmitting a message including the segment and a segment number indicating an order of the segment in the segmented RRC message.

Aspect 11—The method of any one of aspects 1 through 10, wherein transmitting at least the last N−M+1 segments includes transmitting a message including an N-th segment of the segmented RRC message and an indication that the message includes a last segment of the segmented RRC message.

Aspect 12—A user device comprising processing hardware configured to execute a method according to any one of aspects 1 through 11.

Aspect 13—A method, in a base station configured to communicate with a user device via a radio link, for managing communication of a segmented radio resource control (RRC) message that includes N segments, the method comprising: receiving a first L segments of the segmented RRC message from either the user device or another base station, L being an integer greater than zero and less than N; after a failure of the radio link, generating, by processing hardware of the base station, an RRC message indicating that the base station received the first L segments; and transmitting the RRC message to the user device to cause the user device to transmit at least a last N-L segments of the segmented RRC message to the base station.

Aspect 14—The method of aspect 13, wherein causing the user device to transmit at least the last N-L segments includes causing the user device to transmit only the last N-L segments.

Aspect 15—The method of aspect 13 or 14, further comprising: before receiving the first L segments, transmitting, to the user device, an RRC request message that requests the segmented RRC message.

Aspect 16—The method of aspect 15, wherein the RRC message indicating that the base station received the first L segments is an additional RRC request message.

Aspect 17—The method of aspect 16, wherein: the RRC request message and the additional RRC request message both request user device capability information; and the segmented RRC message is a message indicating capabilities of the user device.

Aspect 18—The method of any one of aspects 13 through 17, wherein the segmented RRC message is included in a segmented RRC protocol data unit (PDU).

Aspect 19—The method of any one of aspects 13 through 18, wherein generating the RRC message indicating that the base station received the first L segments occurs after the user device and the base station establish or reestablish an RRC connection.

Aspect 20—The method of any one of aspects 13 through 19, wherein receiving the first L segments includes receiving the first L segments from the user device in a sequential manner.

Aspect 21—The method of any one of aspects 13 through 19, wherein receiving the first L segments includes receiving the first L segments from the other base station in a single message that provides information about the user device.

Aspect 22—The method of any one of aspects 13 through 21, wherein receiving the first L segments includes, for each segment of the first L segments, receiving a message including the segment and a segment number indicating an order of the segment in the segmented RRC message.

Aspect 23—The method of any one of aspects 13 through 22, further comprising: receiving at least a last N-L segments from the user device, wherein receiving the last N-L segments from the user device includes receiving a message including an N-th segment of the segmented RRC message and an indication that the message includes a last segment of the segmented RRC message.

Aspect 24—A base station comprising processing hardware configured to execute a method according to any of one of aspects 13 through 23.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for managing the communication of segmented RRC messages. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, in a user device configured to communicate with a first base station via a radio link, for managing communication of a segmented radio resource control (RRC) message that includes N segments, wherein the segmented RRC message comprises an RRC message that has been divided by an RRC layer of the user device, the method comprising:
transmitting a first M segments of the segmented RRC message to the first base station, M being an integer greater than zero and less than N;
detecting, before transmitting an (M+1)-th segment of the segmented RRC message, a failure of the radio link; and
after detecting the failure of the radio link, transmitting the N segments of the segmented RRC message to either the first base station or a second base station.

2. The method of claim 1, further comprising:
receiving an RRC message from the first base station via the radio link,
wherein transmitting the first M segments occurs in response to receiving the RRC message.

3. The method of claim 2, wherein:
the RRC message is a message requesting user device capability information; and
the segmented RRC message is a message indicating capabilities of the user device.

4. The method of claim 2, further comprising:
after detecting the failure of the radio link, receiving an additional RRC message from the first base station or the second base station,
wherein transmitting the N segments occurs in response to receiving the additional RRC message.

5. The method of claim 1, further comprising:
in response to detecting the failure of the radio link, initiating, with either the first base station or the second base station, either an RRC connection reestablishment procedure or an RRC connection establishment procedure,
wherein transmitting the N segments occurs after the user device and either the first base station or the second base station establish or reestablish an RRC connection.

6. A user device comprising processing hardware and configured to:
divide a segmented radio resource control (RRC) message into N segments at an RRC layer of the user device;
transmit a first M segments of the segmented RRC message to a first base station via a radio link, M being an integer greater than zero and less than N;
before transmitting an (M+1)-th segment of the segmented RRC message, detect a failure of the radio link; and
after detecting the failure of the radio link, transmit the N segments of the segmented RRC message to either the first base station or a second base station.

7. The user device of claim 6, wherein the user device is further configured to receive an RRC message from the first base station via the radio link, and wherein the user device transmits the first M segments in response to receiving the RRC message.

8. The user device of claim 7, wherein:
the RRC message is a message requesting user device capability information; and
the segmented RRC message is a message indicating capabilities of the user device.

9. The user device of claim 7, wherein the user device is further configured to, after detecting the failure of the radio link, receive an additional RRC message from the first base station or the second base station, and wherein the user device transmits the N segments in response to receiving the additional RRC message.

10. The user device of claim 6, wherein the user device is further configured to, in response to detecting the failure of the radio link, initiate, with either the first base station or the second base station, either an RRC connection reestablishment procedure or an RRC connection establishment procedure, and wherein the user device transmits the N segments after the user device and either the first base station or the second base station establish or reestablish an RRC connection.

* * * * *